(12) United States Patent
Shioji et al.

(10) Patent No.: US 7,230,061 B2
(45) Date of Patent: Jun. 12, 2007

(54) PROCESS FOR PRODUCTION OF WATER-SOLUBLE (METH)ACRYLIC POLYMERS, WATER-SOLUBLE (METH)ACRYLIC POLYMERS, AND USE THEREOF

(75) Inventors: Shorbu Shioji, Himeji (JP); Masaru Ishikawa, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 44 days.

(21) Appl. No.: 10/467,323

(22) PCT Filed: Dec. 6, 2002

(86) PCT No.: PCT/JP02/12805

§ 371 (c)(1),
(2), (4) Date: Jan. 14, 2004

(87) PCT Pub. No.: WO03/048217

PCT Pub. Date: Jun. 12, 2003

(65) Prior Publication Data

US 2004/0110861 A1  Jun. 10, 2004

(30) Foreign Application Priority Data

Dec. 6, 2001 (JP) ............................. 2001-372988
Dec. 28, 2001 (JP) ............................. 2001-399982

(51) Int. Cl.
C08F 20/06 (2006.01)
C08F 2/46 (2006.01)
C09K 17/22 (2006.01)
A61K 9/70 (2006.01)
A61K 47/32 (2006.01)
C09K 103/00 (2006.01)

(52) U.S. Cl. ................. 526/328; 526/328.5; 526/329.5; 526/329.2; 522/84

(58) Field of Classification Search ................. 526/328, 526/328.5, 329.2, 329.5; 522/84
See application file for complete search history.

(56) References Cited

U.S. PATENT DOCUMENTS

| 4,105,519 A | 8/1978 | Pennewiss et al. |
| 4,178,221 A | 12/1979 | Boutin et al. |
| 4,308,120 A | 12/1981 | Pennewiss et al. |
| 4,308,129 A | 12/1981 | Gladrow et al. |
| 4,612,336 A | 9/1986 | Yada et al. |
| 4,857,610 A | 8/1989 | Chmelir et al. |
| 4,865,886 A * | 9/1989 | Itoh et al. .................... 427/342 |
| 4,893,999 A | 1/1990 | Chmelir et al. |
| 5,317,063 A | 5/1994 | Komatsu et al. |
| 6,036,869 A * | 3/2000 | Selvarajan et al. ......... 210/733 |
| 6,211,296 B1 * | 4/2001 | Frate et al. .................. 525/207 |
| 6,565,981 B1 * | 5/2003 | Messner et al. ............ 428/441 |

FOREIGN PATENT DOCUMENTS

| EP | 1 034 192 B1 | 9/2000 |
| GB | 1 379 088 | 1/1975 |
| JP | 48-58079 | 8/1973 |
| JP | 52-47084 | 4/1977 |
| JP | 52-126494 | 10/1977 |
| JP | 55-50002 | 4/1980 |
| JP | 61-155405 | 7/1986 |
| JP | 61-155406 | 7/1986 |
| JP | 61-260014 | 11/1986 |
| JP | 62-063512 | 3/1987 |
| JP | 62-156102 | 7/1987 |
| JP | 63-44097 | 2/1988 |
| JP | 64-081886 | 3/1989 |
| JP | 03-174417 A | 7/1991 |
| JP | 04-345685 | 12/1992 |
| JP | 06-056912 | 3/1994 |
| JP | 08-053346 | 2/1996 |
| JP | 08-067715 | 3/1996 |
| JP | 08-120009 | 5/1996 |
| JP | 09-176638 | 7/1997 |
| JP | 10-231308 | 9/1998 |
| JP | 10-231309 | 9/1998 |
| JP | 11-035606 | 2/1999 |
| JP | 11-228609 | 8/1999 |

(Continued)

OTHER PUBLICATIONS

PAJ machine assisted translation obtained Aug. 29, 2005 of JP 2000-212222, published Aug. 2, 2000.*

*Primary Examiner*—Susan Berman
(74) *Attorney, Agent, or Firm*—Connolly, Bove, Lodge & Hutz, LLP

(57) ABSTRACT

The present invention is a method of producing a (meth) acrylic acid based water-soluble polymer having a content of groups in neutralized state of not more than 90 mole percent, where the sum total of acid groups and groups in neutralized state contained in the (meth)acrylic acid based water-soluble polymer is taken as 100 mole percent, which comprises a photopolymerization step of polymerizing a monomer component by irradiating near-ultraviolet rays to a reaction mixture, the said reaction mixture comprising the monomer component, a photopolymerization initiator, a chain transfer agent and a polymerization solvent, the said monomer component containing not less than 50 mole percent of a (meth)acrylic acid monomer, with the whole monomer component subjected to polymerization being taken as 100 mole percent, and a concentration of the said monomer component in the reaction mixture at the time of polymerization being 40 to 97% by mass.

6 Claims, 5 Drawing Sheets

FOREIGN PATENT DOCUMENTS

| | | |
|---|---|---|
| JP | 2000-212222 | 8/2000 |
| JP | 3162696 B2 | 2/2001 |
| JP | 2001-524557 A | 12/2001 |
| JP | 2002-069104 | 3/2002 |
| JP | 2003-64235 A | 3/2003 |
| WO | WO-99/26988 | 6/1999 |

* cited by examiner (a)

(b)

PROCESS FOR PRODUCTION OF WATER-SOLUBLE (METH)ACRYLIC POLYMERS, WATER-SOLUBLE (METH)ACRYLIC POLYMERS, AND USE THEREOF

TECHNICAL FIELD

The present invention relates to a method of producing a (meth)acrylic acid based water-soluble polymers, to (meth) acrylic acid based water-soluble polymers and to dug soil treating agents and cataplasm additives which comprise the (meth)acrylic acid based water-soluble polymers.

BACKGROUND ART (Meth)acrylic polymers are known to exhibit effects as flocculation and thickening properties and are in use, in the field of medicines, as additives and hydrophilic ointment bases for the purpose of improving the adhesiveness and water retention of fomentations and cataplasms. In the field of paints, these polymers are used as carpet compound thickeners, and as paint thickeners or tackifiers or adhesiveness improvers. In production processes, they are applied for many different applications as red mud settling agents in the production of alumina, and as flocculants for saline water purification in the soda industry. In the field of civil engineering and construction, these polymers are used as dug soil treating agents, dredged soil treating agents and mud modifiers. For example, dug soil treating agents containing such (meth)acrylic polymers are used to solidify hydrous soil resulting from drilling engineering for reutilization of the same. Furthermore, they are used as moisture absorbents, desiccants, surface modifiers, and various thickening agents in other fields of industry in general.

Since (meth)acrylic polymers can be used in such useful fields of application, various investigations have been made to improve their performance characteristics.

Meanwhile, investigations have been made also on the method of producing (meth)acrylic polymers by photopolymerization. Concerning such technology, Japanese Kokai Publication Sho-48-58079 (Japanese Kokoku Publication Sho-56-15808) discloses a method of obtaining low-molecular-weight acrylic polymers and copolymers by photopolymerization. The above-cited Japanese Kokai Publication Sho-48-58079 describes an example in which methanol is added as a chain transfer agent and the photopolymerization is carried out at a concentration, on the occasion of polymerization, of the monomers used of about 60% by weight to about 80% by weight. However, the main component of the monomer composition used is acrylamide, and acrylic acid, which is one of (meth)acrylic acid monomers, is used only in an amount of several percent; this production technology is thus concerned with water-soluble polymers different from the water-soluble polymers which the present invention is to provide. In addition, the polymers disclosed in the above-cited publication are not polymers having sufficient physical properties desired for use as dug soil treating agents or cataplasm additives.

Japanese Kokai Publication Sho-61-155405 (Japanese Kokoku Publication Hei-5-53804), Japanese Kokai Publication Sho-61-155406 (Japanese Kokai Publication Hei-5-32410), Japanese Kokai Publication Hei-10-231309 and Japanese Kokai Publication Hei-11-228609 each discloses a method of producing water-soluble polymers by photopolymerization. The above-cited Japanese Kokai Publication Hei-10-231309, for instance, describes that when the amount of the photopolymerization initiator is reduced, the generation of heat and abrupt progress of reaction can be prevented, with the result that polymer gels having a thickness of at least 30 mm can be produced. The monomer compositions used here mainly comprise acrylamide, with a slight amount of acrylic acid, as similar to the method in Japanese Kokai Publication Sho-48-58079. Thus, the polymers disclosed there differ from the water-soluble polymers which the present invention is to provide; these polymers are not polymers having sufficient physical properties desired for use as dug soil treating agents or cataplasm additives. Japanese Kokai Publication Hei-10-231308, the applicant of which is the same as that of Japanese Kokai Publication Hei-10-231309, discloses a technology of reducing the heat generation during polymerization by using an acylphosphine oxide as a photopolymerization initiator. The main component subjected to polymerization according to Japanese Kokai Publication Hei-10-231308 is acrylamide and the amount of acrylic acid is small, hence the resulting polymers are different from the water-soluble polymers to be provided in the present invention. These publications do not disclose the use of a chain transfer agent.

The above-cited Japanese Kokai Publication Hei-11-228609 describes, as an efficient cooling method during polymerization, a technology of cooling the aqueous solution of monomer by covering the same with an optically transparent film. Although it describes the use of a chain transfer agent and the mode in which a monomer concentration during photopolymerization is 25% by weight to 80% by weight, the main modes of practice are directed to the polymerization of acrylamide and dimethylaminoethyl acrylate; this technology is not one concerning the mode of polymerization of monomer compositions in which acrylic acid is a main component. Although there is described the mode of practice in which acrylic acid is used in part, no chain transfer agent is used there and the concentration in the step of polymerization is as low as 35%; there is no disclosure about the physical properties desired of the acrylic acid water-soluble polymers which the present invention is to provide. Further, as for the acrylamide polymers as polymers to be used in soil treating agents or cataplasm additives, the toxicity of acrylamide possibly remaining after polymerization is a problem and there is a tendency toward restriction of the use of those polymers. The water-soluble polymer technologies that are the subject matters in the publications cited above have a problem in this respect.

Japanese Kokai Publication Sho-61-155405 and Japanese Kokai Publication Sho-61-155406 also describe a method of photopolymerization on a belt using likewise an acrylamide monomer. As for the monomer concentration in the reaction mixture to be subjected to polymerization, Japanese Kokai Publication Sho-61-155405 describes a concentration range of 20 to 45% by weight. However, like in the other publications discussed above, each technology is directed to the production of acrylamide polymers, namely polymers differing from the water-soluble polymers of the present invention which are obtained by polymerization of a monomer composition comprising acrylic acid as the main component.

Further, Japanese Kokai publication Sho-62-156102 (corresponding to U.S. Pat. No. 4,857,610 and U.S. Pat. No. 4,893,999) discloses a technology of polymerizing a water-soluble monomer(s), typically (meth)acrylic acid, acrylamide, acrylamidemethylpropanesulfonic acid and/or dimethylaminomethyl acrylate, by feeding the same on a belt under photoirradiation. This publication describes a mode of continuous polymerization using a belt polymerization apparatus having a specific form and structure and, as regards the water-soluble monomer concentration in the reaction mixture, the specification thereof describes a range of 16 to 60% by weight. No chain transfer agent is used, however. Thus, the physical properties of the resulting water-soluble polymers do not exceed the levels conventional in the art. The modes of polymerization as disclosed in the examples do not include any mode of polymerization using, in particular, a (meth)acrylic acid monomer as the main monomer component and setting the monomer concentration at a high level. Thus, Japanese Kokai Publication Sho-62-156102 does not describe any specific conditions concerning the production of those water-soluble (meth) acrylic polymers improved in physical properties which the present invention is to provide. The above publication contains no description about the specific uses of said water-soluble polymers as dug soil treating agents and cataplasm additives.

In Japanese Kokai Publication Sho-52-47084, there is disclosed a method of radical polymerization or copolymerization of a water-soluble monomer or monomer mixture either alone or in admixture with an unpolymerizable inert substance under UV irradiation. In Japanese Kokai Publication Sho-55-50002, there is disclosed a method of radical polymerization or radical copolymerization in which the polymerization process is adjusted by increasing the intensity of ultraviolet irradiation with the lapse of time. However, the water-soluble polymers described in the above-cited publications are acrylamide polymers, which differ from the water-soluble polymers to be provided by the present invention. Furthermore, Japanese Kokai Publication Sho-52-126494 (Japanese Kokoku Publication Sho-55-12445) discloses a method of producing high-molecular-weight water-soluble acrylic polymers which comprises continuously feeding an aqueous solution of an acrylic monomer or monomers onto a support to deposit the solution as a thin layer and irradiating this liquid thin layer with actinic radiation at a specific mean output. While it is described on page 4 of this specification that the monomer concentration in the polymerization is preferably 20 to 60% by weight, the water-soluble polymers disclosed in the examples are exclusively in the fully neutralized form, namely in the form resulting from complete neutralization of 100 mole percent of the acid groups which each water-soluble polymer has. Therefore, there is no specific description about the partly neutralized or unneutralized, water-soluble (meth)acrylic polymers which the present invention is to provide. The polymers described in this publication are acrylamide polymers differing from the polymers which the present invention is to provide.

Furthermore, according to these technologies, the intensity of exposure light is increased after the initiation of polymerization and, therefore, there is room for contrivance for adequately adjusting the light intensity so that polymers capable of fully exhibiting their useful effects in various fields of application may be produced while inhibiting an uncontrolled polymerization due to an anomalous reaction from occurring and thus increasing the safety of the process.

As regards the technology of dug soil treating agents using (meth)acrylic polymers, Japanese Kokai Publication Sho-64-81886 (Japanese Kokoku Publication Hei-3-2478) discloses a hydrous soil solidifying agent comprising a (meth)acrylamide (co)polymer and gypsum, and Japanese Kokai Publication Hei-4-345685 (Japanese Patent Publication No. 2529785) discloses a modifier for hydrous soil which comprises a carboxyl group-containing, water-soluble polymer, such as a sodium acrylate-acrylamide copolymer, and gypsum. However, the use of the acrylamide polymers according to these technologies is much restricted in view of the toxicity of the residual monomer (acrylamide). Japanese Kokoku Publication Hei-6-31514 (Japanese Kokai Publication Sho-63-44097) discloses a method of treating dug soil using a specific, water-soluble synthetic polymer substance. The water-soluble polymer substance is high in safety but a relatively large amount thereof is required for solidifying dug soil, hence an improvement in this respect is desired. Furthermore, Japanese Kokai Publication Hei-9-176638 discloses a modifier for hydrous soil which comprises an aqueous solution of polyacrylic acid and/or a salt thereof. Although this modifier in which polyacrylic acid is used is evaluated relatively highly, there is room for contrivance for still more improving its performance characteristics when it is used at low addition amounts.

More specifically, the above-cited Japanese Kokai Publication Hei-9-176638 discloses, in Example 1, a species of polyacrylic acid which has a weight average molecular weight of 800,000 with a neutralization degree of 0%. The above document, however, does not describe by which the method of production the polyacrylic acid was prepared nor describe the insoluble matter content or other data. Further, the water-soluble polymers disclosed in Example 1 and Example 5 in the above publication are not so high in soil treating property; this is presumably due to their low molecular weights. The above-cited Japanese Kokai Publication Hei-9-176638 does not contain any description at all about the fact that when the monomer concentration is increased and a chain transfer agent is used in the production of (meth)acrylic acid based water-soluble polymers by photopolymerization, the intrinsic viscosity (or weight average inertial radius) can be increased, as well as the insoluble matter content can be reduced, and that the (meth)acrylic acid based water-soluble polymers obtained by such method of production can exhibit significant water treatment performance characteristics.

As for the technology of cataplasm additives, completely neutralized forms of polymers, such as poly(sodium acrylate), have so far been used much. However, cataplasms obtained by using such a completely neutralized polymer are low in adhesiveness or tackiness, so that there arise such problems as falling or turning up thereof from the sites of application. To overcome these problems, Japanese Kokai Publication Sho-61-260014, for instance, proposes the use of a partially neutralized polyacrylic acid salt. Japanese Kokai Publication Sho-62-63512 (Japanese Kokoku Publication Hei-6-6533) proposes the combined use of poly (sodium acrylate) of the completely neutralized form and unneutralized polyacrylic acid. Furthermore, Japanese Kokai Publication Hei-8-53346 proposes the use of unneutralized-form polyacrylic acid as the additive. The additives according to these technologies are evaluated relatively highly from the adhesiveness viewpoint but the shape retentivity when they are used is not sufficient in preparing cataplasms; there is room for improvement in this respect. Thus, there is room for contrivance for allowing (meth) acrylic polymers used as cataplasm additives to provide satisfactorily high levels of adhesiveness and shape retentivity. The term "shape retentivity" as used herein refers to a physical property indicating the elasticity of the base of a cataplasm preparation and thus, for example, refers to a physical property indicating the degree of easiness of returning of an indentation made on the cataplasm base surface with a finger or the like to its original shape.

In Japanese Kokai Publication 2000-212222, there is disclosed a partially neutralized (meth)acrylic acid polymer in which an intrinsic viscosity at 30° C. and a insoluble matter content in deionized water (an ion-exchange water-insoluble content) are specified. Such a (meth)acrylic polymer can exhibits effects as those flocculant and thickener which can be used as a dug soil treating agent and a cataplasm additive. However, the method of polymerization disclosed therein is a thermal polymerization method. There is no description about photopolymerization at all. In particular, nothing is taught about the photopolymerization method for producing (meth)acrylic acid based water-soluble polymers in which the polymerization is carried out using a reaction mixture containing a (meth)acrylic acid monomer(s) at a specified or higher concentration in the presence of a chain transfer agent. The water-soluble polymers disclosed in this publication have a neutralization degree (content of neutralized groups contained in the water-soluble polymer as defined in the present application) of 20 to 95 mole percent and are especially low in neutralization degree. There is no specific description or suggestion about those acid form water-soluble polymers which have a low neutralization degree, specifically a neutralization degree of less than 20 mole percent.

It is supposed that when a (meth)acrylic acid based water-soluble polymer with a low neutralization degree and with a high molecular weight is produced by the thermal polymerization method described in the publication cited above, the gel-like (meth)acrylic acid based water-soluble polymer will adhere to the polymerization apparatus and various other apparatus such as a gel disintegrator. Thus, there is room for contrivance to produce the same in more stabilized manner in a commercial scale. Further problems are anticipated, for example the residual monomer content of the gel-like polymer obtained will become increased, and the insoluble matter content will increase since the polymer is in an easily crosslinkable condition. Thus, there is room for contrivance for making it possible to produce water-soluble polymers with a low neutralization degree in a stable manner on a commercial scale applying said method of polymerization.

Those (meth)acrylic acid based water-soluble polymers having a neutralization degree of 20 to 95 mole percent are lower in adhesiveness as compared with the (meth)acrylic acid based water-soluble polymers with a neutralization degree of less than 20 mole percent, however, for producing water-soluble polymers with a higher molecular weight stably on a commercial scale, the thermal polymerization method described in the above-cited Japanese Kokai Publication 2000-212222 has room for contrivance.

SUMMARY OF THE INVENTION

The present invention, which has been made in view of the above-discussed state of the art, has for its object to provide a method of efficiently producing (meth)acrylic acid based water-soluble polymers with a high intrinsic viscosity (or weight average inertial radius) and a suppressed insoluble matter content while inhibiting bumping and other uncontrollable anomalous reactions. Another object is to provide (meth)acrylic acid based water-soluble polymers capable of exhibiting excellent flocculating and thickening effects as compared with the (meth)acrylic acid based water-soluble polymers produced by the prior art methods and therefore capable of being adequately applied in various fields, and outstanding in safety and capable of modifying hydrous soil into a soil high in strength and easy to handle at low addition amounts when used as dug soil treating agents, and capable of providing high adhesiveness and shape retentivity when used as cataplasm additives. A further object is to provide dug soil treating agents and cataplasm additives which comprise such (meth)acrylic acid based water-soluble polymers.

The present inventors made various investigations concerning the process of producing (meth)acrylic acid based water-soluble polymers and, as a result, found that when, in a process of producing (meth)acrylic acid based water-soluble polymers from a monomer component containing not less than 50 mole percent of a (meth)acrylic acid monomer per 100 mole percent of the sum of monomer component subjected to polymerization, the concentration of the monomer components in the reaction mixture subjected to polymerization is adjusted to a certain specific value or above and, further, a chain transfer agent is used and the production method by polymerization with photopolymerization under irradiation with near-ultraviolet rays is employed, the polymerization time can be reduced as compared with the conventional methods, namely thermal polymerization methods, and the (meth)acrylic acid based water-soluble polymers can be produced in an efficient manner.

They also found that even when the polymerization temperature is lowered, the polymerization proceeds smoothly, enabling the production at high concentrations in connection with the removal of heat. They further found that when the above constitution is employed, the productivity is improved, the intrinsic viscosity or weight average inertial radius becomes sufficiently high, the fundamental performance characteristics of the polymers are thus improved and the polymers obtained are low in insoluble matter content and, thus, the above problems can successfully be solved.

Further, they found that when the polymerization is started under irradiation with near-ultraviolet rays at a specific intensity, the fundamental performance characteristics of the (meth)acrylic acid based water-soluble polymers can be more improved and the insoluble matter content can be further reduced. Furthermore, they found that when, in carrying out the photopolymerization using a monomer composition in which the proportion of the (meth)acrylic acid monomer is 100 mole percent, the intensity of photoirradiation is lowered, as compared with the near-ultraviolet rays used for initiation of the polymerization, or repeatedly changed so as to show strong/weak (inclusive of the state in which the photoirradiation intensity is zero) cycles, after the start of photopolymerization but while the (meth)acrylic acid monomer occurs in the polymerization system within a certain specific concentration range, the intrinsic viscosity (or weight average inertial radius) of the (meth)acrylic acid based water-soluble polymers can be increased and the insoluble matter content thereof can be suppressed and, further, bumping and other anomalous reactions can be prevented and, thus, the (meth)acrylic acid based water-soluble polymers can be produced efficiently.

They also made various investigations in search for (meth)acrylic polymers capable of exhibiting flocculating and thickening effects and, as a result, they paid their attention to the fact that those (meth)acrylic acid based water-soluble polymers of which the content of groups in a neutralized state (hereinafter referred to as neutralization degree) is less than 20 mole percent where the sum of the acid groups and neutralized groups of the (meth)acrylic acid based water-soluble polymer in question is taken as 100 mole percent, are suited for exhibiting flocculating and thickening effects and they found that when the intrinsic viscosity thereof is high and in a specific range, the flocculating and thickening effects can be satisfactorily improved owing to the high intrinsic viscosity. Such a (meth)acrylic acid based water-soluble polymer with a neutralized group content of less than 20 mole percent is herein-referred to also as "acid form (meth)acrylic acid based water-soluble polymer". They further found that the (meth)acrylic acid based water-soluble polymers produced by the production method mentioned above are suitable as such acid form (meth) acrylic acid based water-soluble polymers.

Furthermore, they found that among the (meth)acrylic acid based water-soluble polymers produced by the above production method, those (meth)acrylic acid based water-soluble polymers of which the content of groups in a neutralized state is 20 to 80 mole percent where the sum of the acid groups and neutralized groups of the (meth)acrylic acid based water-soluble polymer in question is taken as 100 mole percent and which have a specified weight average inertial radius can produce remarkable effects as dug soil treating agents and cataplasm additives among the above-mentioned large number of application fields. Such a (meth) acrylic acid based polymer having a neutralized group content of 20 to 80 mole percent is referred to also as "partially neutralized (meth)acrylic acid based water-soluble polymer". They also found that the physical property, weight average inertial radius, to which special attention has been paid is a very distinct criterion in selecting the partially neutralized (meth)acrylic acid based water-soluble polymers to be used for the intended purpose, namely for further improving the dug soil treating agents or cataplasm additives.

As general means for expressing the size of polymer molecules, there are weight average inertial radius and intrinsic viscosity. The weight average inertial radius is an indicator of the approximate size of the thread balls produced when the polymer is caused to assume such a thread ball-like form under specific conditions. On the other hand, the intrinsic viscosity is an indirect indicator of the length of molecules in a state linearly stretched under specific conditions. Essentially, they are quite different from each other. As mentioned above, the present inventors found that those partially neutralized (meth)acrylic acid based water-soluble polymers which have a specific weight average inertial radius and satisfy specific requirements can produce remarkable effects as dug soil treating agents and cataplasm additives.

And, furthermore, they found that as the deionized water-insoluble matter content of the (meth)acrylic acid based water-soluble polymer decreases, the product quality thereof becomes improved owing to the decreased insoluble matter content and, at the same time, the polymer becomes able to produce the desired effects more sufficiently. Further, they found that when the (meth)acrylic acid based water-soluble polymer is one resulting from polymerization of a monomer composition containing 2-acrylamide-2-methylpropane-sulfonic acid (salt) and 3-allyloxy-2-hydroxypropane-sulfonic acid (salt), the intrinsic viscosity or weight average inertial radius after complete neutralization can be increased and or the insoluble matter content can be still more decreased. These findings have led to completion of the present invention. Generally, when polyacrylic acid with a high weight average molecular weight is produced by thermal polymerization under the conventional conditions or by photopolymerization under the conditions known in the art, high insoluble matter contents will result; it is difficult to obtain (meth)acrylic acid based polymers having a specific intrinsic viscosity (or weight average inertial radius) and a low insoluble matter content, such as those provided by the present application. It is not obvious from the prior art technologies, including that of Japanese Kokai Publication Hei-9-176638, that such polymers can produce remarkable effects as hydrous soil modifiers.

Therefore, the present invention is a method of producing a (meth)acrylic acid based water-soluble polymer having a content of groups in neutralized state of not more than 90 mole percent, where the sum total of acid groups and groups in neutralized state contained in the (meth)acrylic acid based water-soluble polymer is taken as 100 mole percent, which comprises a photopolymerization step of polymerizing a monomer component by irradiating near-ultraviolet rays to a reaction mixture, the said reaction mixture comprising the monomer component, a photopolymerization initiator, a chain transfer agent and a polymerization solvent, the said monomer component containing not less than 50 mole percent of a (meth)acrylic acid monomer, where the whole monomer component subjected to polymerization is taken as 100 mole percent, and a concentration of the said monomer component in the reaction mixture at the time of polymerization being 40 to 97% by mass.

The present invention is also directed to a (meth)acrylic acid based water-soluble polymer having a content of groups in neutralized state of less than 20 mole percent, where the sum total of acid groups and groups in neutralized state contained in the (meth)acrylic acid based water-soluble polymer is taken as 100 mole percent, wherein an intrinsic viscosity of a neutralized product obtained by neutralization of all acid groups of the said polymer in a 2 N aqueous solution of sodium hydroxide at 30° C. is 30 to 120 ml/mmol, and wherein an insoluble matter content in deionized water is less than 5% by mass. To produce a (meth) acrylic acid based water-soluble polymer having a content of groups in neutralized state of less than 20 mole percent by the method of producing according to the invention is one of preferable embodiments.

The present invention is also directed to a (meth)acrylic acid based water-soluble polymer produced by the above method of producing a (meth)acrylic acid based water-soluble polymer which has a content of groups in neutralized state of 20 to 80 mole percent, where the sum total of acid groups and groups in neutralized state contained in the (meth)acrylic acid based water-soluble polymer is taken as 100 mole percent, has a weight average inertial radius of not smaller than 160 nm at the state of complete neutralization, and has an insoluble matter content in deionized water of less than 5% by mass, said insoluble matter content being the value determined by adding 1.0 g of said (meth)acrylic acid based water-soluble polymer to 500 g of deionized water, stirring the mixture at 25° C. for 2 hours, filtering the same through a 32-mesh filter, separating the insoluble matter in hydrous state and making a calculation according to the formula:

Insoluble matter content (% by mass)={mass (g) of insoluble matter/500 (g)}×100.

The present invention is a dug soil treating agent which comprises the above (meth)acrylic acid based water-soluble polymer as a main component.

The present invention is further a cataplasm additive which comprises the above (meth)acrylic acid based water-soluble polymer as a main component.

DETAILED DISCLOSURE OF THE INVENTION

In the following, the present invention is described in detail.

The method of producing a (meth)acrylic acid based water-soluble polymer according to the invention is a method of producing a (meth)acrylic acid based water-soluble polymer of which the content of groups in a neutralized state is not more than 90 mole percent where the sum total of the acid groups and neutralized groups contained in the (meth)acrylic acid based water-soluble polymer in question is taken as 100 mole percent. In the present specification, the content of groups in a neutralized state, with the sum of the acid groups and neutralized groups being taken as 100 mole percent is referred also to as neutralization degree. For example, the above-mentioned (meth)acrylic acid based water-soluble polymers having a neutralization degree of not more than 90 mole percent are (meth)acrylic acid based water-soluble polymers of which the content of groups in a neutralized state is not more than 90 mole percent where the sum of the acid groups and neutralized groups of the (meth)acrylic acid based water-soluble polymer in question is taken as 100 mole percent.

The method of producing a (meth)acrylic acid based water-soluble polymer according to the invention comprises a photopolymerization step for obtaining the (meth)acrylic acid based water-soluble polymers in which step a monomer component containing not less than 50 mole percent, preferably not less than 70 mole percent, more preferably not less than,80 mole percent, most preferably not less than 85%, of a (meth)acrylic acid monomer, with the total monomer component subjected to polymerization being taken as 100 mole percent, a photopolymerization initiator, a chain transfer agent and a polymerization solvent is irradiated with near-ultraviolet rays to thereby polymerize the monomer component. The mole percent value mentioned above with respect to the (meth)acrylic acid monomer is a value relative to 100 mole percent of the sum of the monomer component to be used.

The present application is concerned with a method of polymer production which comprises the step of photopolymerization. Since heat is generated after the start of photopolymerization, a thermal polymerization initiator may be used in combination with the photopolymerization initiator so that the polymerization may be promoted by utilizing the heat generated. The polymerization may be started in the manner of thermal polymerization, and/or thermal polymerization may be combinedly used during polymerization.

The monomer component comprising not less than 50 mole percent of a (meth)acrylic acid monomer per 100 mole percent of the sum of the monomer component to be used in the above polymerization comprises a (meth)acrylic acid monomer(s), if necessary together with some other monomer or monomers. The other monomers may be used singly or two or more species may be used in combination. The (meth)acrylic acid based polymer is a polymer obtained by polymerization of a monomer component comprising a (meth)acrylic acid monomer(s) being constituted by (meth)acrylic acid and (meth)acrylic acid salts, as an essential constituent(s).

In the monomer component mentioned above, the (meth)acrylic acid monomer is (meth)acrylic acid and/or a (meth)acrylic acid salt. As the (meth)acrylic acid salt, products of neutralization of (meth)acrylic acid with a univalent metal, a bivalent metal, ammonia, an organic amine, or the like, namely sodium (meth)acrylate, potassium (meth)acrylate, magnesium (meth)acrylate, calcium (meth)acrylate, and ammonium (meth)acrylate are suitable. Among these, sodium (meth)acrylate is preferred. Sodium acrylate is more preferred. The (meth)acrylic acid monomers mentioned above may be used singly or two or more of them may be used in combination.

In producing those acid form (meth)acrylic acid based water-soluble polymers to be described later herein of which the content of groups in neutralized state is less than 20 mole percent where the sum of the acid groups and neutralized groups of the (meth)acrylic acid based water-soluble polymer in question is taken as 100 mole percent, the monomer group is preferably selected so that the content of groups in neutralized state accounts for less than 20 mole percent with the total sum of acid groups and groups in neutralized state in the total of monomers including the (meth)acrylic acid monomer(s) and the acid group-containing monomer(s) other than (meth)acrylic acid monomers being taken as 100 mole percent. By selecting the monomer group as such, the acid form (meth)acrylic acid based water-soluble polymers obtained by the production method according to the invention can exhibit their flocculating and/or thickening effects more sufficiently.

In producing those partially neutralized (meth)acrylic acid based water-soluble polymers of which the content of groups in a neutralized state is 20 to 80 mole percent, where the sum of the acid groups and neutralized groups of the (meth)acrylic acid based water-soluble polymer in question is taken as 100 mole percent, the monomer group is preferably selected so that the content of groups in a neutralized state accounts for 20 to 80 mole percent, where the total sum of acid groups and groups in a neutralized state in the total of monomers including the (meth)acrylic acid monomer(s) and the acid group-containing monomer(s) other than (meth)acrylic acid monomers is taken as 100 mole percent.

The concentration, in the reaction mixture, of the monomer component containing not less than 50 mole percent of the above (meth)acrylic acid monomer(s) is preferably not less than 40% by mass, more preferably not less than 50% by mass. On the other hand, it is preferably not more than 97% by mass, more preferably not more than 95% by mass. When the conventional methods of polymerization are employed, an increased (meth)acrylic acid monomer concentration in the reaction mixture will result in the occurrence of bumping and other anomalous reactions, rendering it difficult to control the reaction. However, the production method involving photopolymerization according to the invention does not have the above problems even when the concentration, in the reaction mixture, of the monomer component containing not less than 50 mole percent of a (meth)acrylic acid monomer(s) is increased to a high level.

Suitable as the monomer other than (meth)acrylic acid monomers are such acid group-containing monomers as unsaturated monocarboxylic acid monomers, for example α-hydroxyacrylic acid and crotonic acid, and univalent metal, bivalent metal, ammonium and organic amine salts thereof; unsaturated dicarboxylic acid monomers, such as maleic acid, fumaric acid, itaconic acid and citraconic acid, and univalent metal, bivalent metal, ammonium and organic amine salts thereof; unsaturated sulfonic acid monomers, such as vinylsulfonic acid, allylsulfonic acid, methallylsulfonic acid, styrenesulfonic acid, 2-acrylamide-2-methylpropanesulfonic acid, 3-allyloxy-2-hydroxypropanesulfonic acid, sulfoethyl(meth)acrylate, sulfopropyl(meth)acrylate, 2-hydroxysulfopropyl(meth)acrylate and sulfoethylmaleimide, and univalent metal, bivalent metal, ammonium and organic amine salts thereof; and unsaturated phosphonic acid monomers, such as (meth)acrylamidemethanephosphonic acid and 2-(meth)acrylamide-2-methylpropanephosphonic acid, and univalent metal, bivalent metal, ammonium and organic amine salts thereof.

The above-mentioned acid group-containing monomers other than (meth)acrylic acid monomers may be used singly or two or more of them may be used in combination.

In producing partially neutralized (meth)acrylic acid based water-soluble polymers whose neutralized group content is 20 to 80 mole percent by the production method according to the invention, the mode in which the polymer is obtained by using a monomer component containing not less than 50 mole percent of a (meth)acrylic acid monomer(s) with a neutralized group content of 20 to 80 mole percent when the total sum of acid groups and neutralized groups occurring in the sum of the (meth)acrylic acid monomer(s) and an acid group-containing monomer(s) other than (meth)acrylic acid monomers is taken as 100 mole percent, as mentioned above, is preferred, however, it is also possible to produce them by producing a polymer using a required amount of a (meth)acrylic acid monomer(s) and then neutralizing the polymer with an alkaline substance, such as sodium hydroxide, so that the neutralization degree of the polymer itself amounts to 20 to 80 mole percent.

The mode of production, by the production method according to the invention, of those (meth)acrylic acid based water-soluble polymers whose neutralized group content is less than 20 mole percent is similar to the one mentioned above, hence no more description is made here.

As the monomers which can be used in the practice of the invention other than the above-mentioned acid group-containing monomers, there may be mentioned amide monomers such as (meth)acrylamide and tert-butyl(meth)acrylamide; hydrophobic monomers such as (meth)acrylic esters, styrene, 2-methylstyrene and vinyl acetate; hydroxyl group-containing unsaturated monomers such as 3-methyl-2-buten-1-ol(prenol), 3-methyl-3-buten-1-ol(isoprenol), 2-methyl-3-buten-2-ol(isoprene alcohol), 2-hydroxyethyl(meth) acrylate, polyethylene glycol mono(meth)acrylate, polypropylene glycol mono(meth)acrylate, polyethylene glycol monoisoprenol ether, polypropylene glycol monoisoprenyl ether, polyethylene glycol monoallyl ether, polypropylene glycol monoallyl ether, glycerol monoallyl ether, N-methylol(meth)acrylamide, glycerol mono(meth)acrylate and vinyl alcohol; alkoxyalkylene glycol mono(meth)acrylates such as methoxypolyethylene glycol mono(meth)acrylate; cationic monomers such as dimethylaminoethyl(meth) acrylate and dimethylaminopropyl(meth)acrylate; and nitrile monomers such as (meth)acrylonitrile.

Since acrylamide monomers, in particular, are low in polymerizability and easy to remain, and when they remain, there arises the safety problem; therefore, in a preferred embodiment of the invention, the amount of an acrylamide monomer(s) mentioned above, when used as the other monomer(s), should preferably be not more than 30 mole percent, more preferably 20 mole percent to 0 mole percent, still more preferably 10 mole percent to 0 mole percent, most preferably 5 mole percent to 0 mole percent, where the monomers subjected to polymerization is taken as 100 mole percent.

The above-mentioned monomer component preferably contains the univalent metal, bivalent metal or ammonium salt of the unsaturated sulfonic acid monomer among the above-mentioned monomers other than (meth)acrylic acid monomers. More specifically, it preferably contains 2-acrylamide-2-methylpropanesulfonic acid (salt) and/or 3-allyloxy-2-hydroxypropanesulfonic acid (salt), among them. The use of such monomer(s) in producing acid form (meth) acrylic acid based water-soluble polymers makes it possible to produce polymers low in insoluble matter content and high in intrinsic viscosity. The use thereof in producing partially neutralized (meth)acrylic acid based water-soluble polymers makes it possible to further increase the weight average inertial radius upon complete neutralization of the polymers, so that the fundamental performance characteristics of the polymers can be improved. In addition, the insoluble matter content can be reduced. The content of the above-mentioned monomer(s) other than (meth)acrylic acid monomers is preferably less than 50 mole percent, more preferably not less than 1 mole percent but less than 50 mole percent, still more preferably not less than 1 mole percent but less than 30 mole percent, especially preferably not less than 1 mole percent but less than 20 mole percent, most preferably not less than 2 mole percent but less than 15 mole percent, relative to 100 mole percent of the whole monomer component.

The concentration, in the reaction mixture, of the above-mentioned monomer component to be subjected to polymerization is 40 to 97% by mass. In carrying out the method of producing the water-soluble polymer by photopolymerization according to the invention, a higher concentration of the monomer component at the time of polymerization can improve fundamental performance characteristics of the polymer. Specifically, when the monomer component concentration at the time of polymerization is within the above-mentioned concentration range, the molecular weight of the water-soluble polymer can be increased while maintaining the insoluble matter content at a low level. Specifically, the above-mentioned concentration is the monomer component concentration in the reaction mixture at the time of initiation of the polymerization. When, in producing acid form (meth) acrylic acid based water-soluble polymers, a chain transfer agent is used and the monomer component concentration at the time of polymerization is increased in accordance with the photopolymerization method according to the invention, the intrinsic viscosity can be more increased. In producing partially neutralized (meth)acrylic acid based water-soluble polymers, the weight average inertial radius at the state of complete neutralization can be more increased and the flocculating and/or thickening effects of the above water-soluble polymers can be further increased. In addition, the insoluble matter content of the water-soluble polymers to be obtained can be reduced.

Generally, when an attempt is made to obtain an acrylic acid water-soluble polymer high in intrinsic viscosity and/or large in weight average inertial radius in the conventional polymerization manner, the insoluble matter content unfavorably increases as the intrinsic viscosity or weight average inertial radius increases. The problems encountered in the prior art can be solved by carrying out the photopolymerization under the above-described specific conditions in accordance with the present invention. Further, the photopolymerization method according to the invention is further advantageous in that the productivity can be improved simultaneously. Specifically, when the polymerization is carried out at a low concentration of monomer component less than 40% by mass, the equipment required for obtaining a unit mass of a dry product becomes larger as compared with the case of a high concentration of monomer component of not less than 40% by mass. In addition, the utility required for drying becomes greater. Therefore, the low concentration polymerization results in a higher cost of production as compared with the high concentration polymerization. Furthermore, the gel formed is stronger in tackiness than the gel obtained by the high concentration polymerization and is difficult to be released from the belt surface and disintegrate, causing processing problems as well.

From the physical properties viewpoint, polymers obtained by the low concentration polymerization are low in intrinsic viscosity when they are acid form (meth)acrylic acid based water-soluble polymers, or low in weight average inertial radius and, in addition, tend to have an increased insoluble matter content when they are partially neutralized (meth)acrylic acid based water-soluble polymers. Furthermore, the residual monomer content increases. Thus, there arises a problem about the completeness of polymerization. The concentration of the above-mentioned monomer component in the reaction mixture is preferably 45 to 97% by mass, more preferably 45 to 95% by mass, still more preferably 50 to 95% by mass, farther preferably not less than 55% by mass but not more than 90% by mass, particularly preferably not less than 65% by mass, most preferably not less than 70% by mass.

The above-mentioned monomer component concentration in the reaction mixture is based on the reaction mixture containing the whole monomer component subjected to polymerization, which is taken as 100% by mass. Specifically, the concentration is expressed on a 100%-by-mass scale with the whole monomer component to be used being the denominator.

Preferred examples of the above-mentioned photopolymerization initiator are as follows.

2,2'-Azobis(2-amidinopropane), 2,2'-azobis(N,N'-dimethyleneisobutyramidine), 2,2'-azobis[2-(5-methyl-2-imidazolin-2-yl)propane], 1,1'-azobis(1-amidino-1-cyclopropylethane), 2,2'-azobis(2-amidino-4-methylpentane), 2,2'-azobis(2-N-phenylaminoamidinopropane), 2,2'-azobis(1-imino-1-ethylamino-2-methylpropane), 2,2'-azobis(1-allylamino-1-imino-2-methylbutane), 2,2'-azobis(2-N-cyclohexylamidinopropane), 2,2'-azobis(2-N-benzylamidinopropane) and the hydrochloride, sulfate, acetate or like salt thereof, 4,4'-azobis(4-cyanovalerate) and an alkali metal, ammonium or amine salt thereof, 2-(carbamoylazo)isobutyronitrile, 2,2'-azobis(isobutyramide), 2,2'-azobis[2-methyl-N-(2-hydroxyethyl)propionamide], 2,2'-azobis[2-methyl-N-(1,1'-bis(hydroxymethyl)ethyl)propionamide], 2,2'-azobis[2-methyl-N-1,1'-bis(hydroxyethyl) propionamide] and like azo photopolymerization initiators, 2,2-dimethoxy-1,2-diphenylethane-1-one, 1-hydroxycyclohexyl phenyl ketone, 2-hydroxy-2-methyl-1-phenylpropan-1-one, 1-hydroxycyclohexyl phenyl ketone (Irgacure 184)-benzophenone eutectic mixture, 1-[4-(2-hydroxyethoxy) phenyl]-2-hydroxy-2-methyl-1-propan-1-one, 2-methyl-1-[4-(methylthio)phenyl]-2-morpholinopropan-1-one, 2-benzyl-2-dimethylamino-1-(4-morpholinophenyl)butanone-1,2-benzyl-2-dimethylamino-1-(4-morpholinophenyl)butanone-1(Irgacure 369)-2,2-dimethoxy-1,2-diphenylethan-1-one (Irgacure 651) 3:7 mixture, bis(2,4,6-trimethylbenzoyl)phenylphosphine oxide, bis(2,6-dimethoxybenzoyl)-2,4,4-trimethylpentylphosphine oxide (CGI 403)-2-hydroxy-2-methyl-1-phenylpropan-1-one (Darocure 1173) 1:3 mixture, bis(2,6-dimethoxybenzoyl)-2, 4,4-trimethylpentylphosphine oxide (CGI 403)-1-hydroxycyclohexyl phenyl ketone (Irgacure 184) 1:3 mixture, bis(2, 6-dimethoxybenzoyl)-2,4,4-trimethylpentylphosphine oxide (CGI 403)-1-hydroxycyclohexyl phenyl ketone (Irgacure 184) 1:1 mixture, 2,4,6-trimethylbenzoyldiphenylphosphine oxide-2-hydroxy-2-methyl-1-phenylpropane-1-one (Darocure 1173) 1:1 liquid mixture, bis(η5-2,4-cyclopentadien-1-yl)bis(2,6-difluoro-3-(1H-pyrrol-1-yl)phenyl)titanium, oligo[2-hydroxy-2-methyl-1-[4-(1-methylvinyl)phenyl]propanone], 2,4,6-trimethylbenzophenone-4-methylbenzophenone eutectic mixture, 4-methylbenzophenone-benzophenone liquid mixture, 2,4,6-trimethylbenzoyldiphenylphosphine oxide-oligo[2-hydroxy-2-methyl-1-[4-(1-methylvinyl)phenyl]propanone-methylbenzophenone derivative liquid mixture, 1-[4-(4-benzoylphenylsulfanyl)phenyl]-2-methyl-2-(4-methylphenylsulfanyl)propan-1-one, benzyl dimethyl ketal, 2-hydroxy-2-methyl-1-phenyl-1-propanone, α-hydroxycyclohexyl phenyl ketone, ethyl 4-dimethylaminobenzoate, acrylated amine synergist, benzoin (iso- and n-)butyl ester, acrylsulfonium (mono, di)hexafluorophosphate, 2-isopropylthioxanthone, 4-benzoyl-4'-methyldiphenyl sulfide, 2-butoxyethyl 4-(dimethylamino)benzoate, ethyl 4-(dimethylamino)benzoate, benzoin, benzoin alkyl ethers, benzoin hydroxyalkyl ethers, diacetyl and derivatives thereof, anthraquinone and derivatives thereof, diphenylsulfide and derivatives thereof, benzophenone and derivatives thereof and benzil and derivatives thereof.

Among these, azo photopolymerization initiators are preferably used, and water-soluble azo photopolymerization initiators, such as 2,2'-azobis-2-amidinopropane dihydrochloride, are suitably used.

The photopolymerization initiator is used preferably in an amount of not less than 0.0001 g but not more than 1 g per mole of the monomer component to be subjected to polymerization. By using the initiator in such amount, a molecular weight of the (meth)acrylic acid based water-soluble polymers can be attained satisfactorily high. More preferably, the amount is not less than 0.001 g but not more than 0.5 g.

Suited for use as the chain transfer agent are sulfur-containing compounds such as thioglycolic acid, thioacetic acid and mercaptoethanol; phosphorous acid compounds such as phosphorous acid and sodium phosphite; hypophosphorous acid compounds such as hypophosphorous acid and sodium hypophosphite; and alcohols such as methyl alcohol, ethyl alcohol, isopropyl alcohol and n-butyl alcohol. Among these, hypophosphorous acid compounds are preferred, and sodium hypophosphite is more preferred.

The amount of use of the chain transfer agent may adequately be selected depending on the polymerization concentration, the photopolymerization initiator in combined use, and other factors, but preferably is not less than 0.0001 g but not more than 0.2 g, more preferably not less than 0.001 g but not more than 0.1 g, particularly preferably not less than 0.005 g but nor more than 0.05 g, per mole of the monomer component to be subjected to polymerization.

Water is suitably used as the polymerization solvent mentioned above. In addition to water, an organic solvent, for instance, may appropriately be used in combination. Suited for use as the organic solvent are alcohols such as methanol and ethanol; hydrocarbons such as toluene and xylene; ketones such as methyl isobutyl ketone and methyl ethyl ketone; esters such as methyl acetate, ethyl acetate and butyl acetate; and ethers such as (di)ethylene glycol dimethyl ether.

The photopolymerization initiators, chain transfer agents and polymerization solvents may respectively be used singly or two or more may be used in combination.

In the practice of the invention, the above reaction mixture is irradiated with near-ultraviolet rays in the photopolymerization step.

Suitable apparatus for the near-ultraviolet ray irradiation in the photopolymerization step are high pressure mercury lamps, low pressure mercury lamps, metal halide lamps, fluorescent chemical lamps, and fluorescent blue lamps. The near-ultraviolet rays preferably have a wavelength range not shorter than 300 nm and not longer than 500 nm. Upon irradiation with ultraviolet rays in this wavelength range, the photopolymerization starts and the polymerization reaction proceeds at an adequate rate.

In the practice of the invention, the above photopolymerization step is preferably carried out by irradiating such near-ultraviolet rays at an intensity of 0.1 to 100 W/m$^2$. In particular, the polymerization is preferably initiated by irradiating near-ultraviolet rays at an intensity of not higher than 10 W/m$^2$. By doing so, it becomes possible to further reduce the insoluble matter content. In producing acid form (meth)acrylic acid based water-soluble polymers, the intrinsic viscosity of the polymers can be further increased. In producing partially neutralized (meth)acrylic acid based water-soluble polymers, the weight average inertial radius of the polymers at the state of complete neutralization can be further increased. The intensity is more preferably not higher than 8 W/m$^2$, still more preferably not higher than 6 W/m$^2$, most preferably not higher than 4 W/m$^2$. While the intensity of near-ultraviolet ray irradiation may be either constant or varied during polymerization under near-ultraviolet irradiation, the irradiation intensity is preferably adjusted so that the polymerization may be initiated at an irradiation intensity of at most 10 W/m$^2$. The ultraviolet irradiation intensity used herein is the irradiation intensity measured at the upper surface of the reaction mixture which is to be irradiated with near-ultraviolet rays, namely at the reaction mixture surface. The irradiation intensity can be measured using the following actinometer, for instance.

Apparatus: Integrating ultraviolet actinometer
Manufacturer: Ushio Inc.
Model: Main body UIT-150
Sensor UVD-C365 (sensitive wavelength range 310 to 390 nm)

The photopolymerization step in the practice of the invention is also preferably carried out in the manner in which (1) when the (meth)acrylic acid monomer(s) existing in the reaction mixture after initiation of the polymerization by near-ultraviolet irradiation is 3 to 90 mole percent, where the amount of the (meth)acrylic acid monomer(s) subjected to photopolymerization is taken as 100 mole percent, the near-ultraviolet irradiation intensity is reduced lower than the near-ultraviolet irradiation intensity used for initiating the polymerization, or (2) after initiation of the polymerization by near-ultraviolet irradiation, a step of reducing the near-ultraviolet irradiation intensity lower than that at the time of initiation of the polymerization and a step of increasing the near-ultraviolet irradiation intensity higher than the reduced photoirradiation intensity are repeated. On that occasion, the photoirradiation intensity may be varied either continuously or stepwise.

When the (meth)acrylic acid monomer exists in a specific concentration range in the polymerization system after initiation of the photopolymerization, the near-ultraviolet irradiation intensity is decreased or the photoirradiation intensity is varied repeatedly in a strong/weak (inclusive of the state in which the photoirradiation intensity is zero) manner, whereby the intrinsic viscosity (or weight average inertial radius) of the (meth)acrylic acid based water-soluble polymer can be increased and the insoluble matter content can be suppressed and, furthermore, bumping and other anomalous reactions in the polymerization reaction can be inhibited and, thus, the (meth)acrylic acid based water-soluble polymer can be produced efficiently.

In the above mode of practice (1), the concentration of the (meth)acrylic acid monomer(s) existing in the polymerization system at the time when the near-ultraviolet irradiation intensity is reduced after initiation of the polymerization by near-ultraviolet irradiation as compared with the near-ultraviolet irradiation intensity used for initiating the polymerization is 3 to 90 mole percent relative to 100 mole percent of the (meth)acrylic acid monomer(s) to be used for photopolymerization, as mentioned above; when it is less than 3 mole percent or above 90 mole percent, there arises the possibility of the polymerization remaining incomplete or becoming difficult to control for avoiding a runaway condition. The residual concentration is preferably not less than 5 mole percent but not more than 85 mole percent, more preferably not less than 10 mole percent but not more than 80 mole percent.

By reducing the photoirradiation intensity during the polymerization step at a time when the polymerization state can be sufficiently maintained and the (meth)acrylic acid monomer(s) remain in a sufficient amount(s), not at the terminal phase of polymerization, namely by reducing the photoirradiation intensity at a time when the (meth)acrylic acid monomer(s) remain in a sufficient amount(s) to thereby avoid or reduce excess photoirradiation, it becomes possible to continue the polymerization in a favorable manner.

In the above mode (1), the near-ultraviolet irradiation intensity for initiating the polymerization is preferably not less than 0.1 W/m$^2$ but not more than 100 W/m$^2$. When it is less than 0.1 W/m$^2$, the polymerization may be initiated in an unfavorable manner, resulting in inefficient production. Furthermore, the polymerization tends to become incomplete, and there is a tendency toward the monomer component(s) remaining unreacted. When it exceeds 100 W/m$^2$, the polymerization reaction may proceed abruptly and anomalous reactions, including bumping, may occur. It is more preferably not less than 1 W/m$^2$, still more preferably not less than 3 W/m$^2$. It is more preferably not more than 50 W/m$^2$, still more preferably not more than 30 W/m$^2$. The near-ultraviolet irradiation intensity when photoirradiation intensity is reduced, after initiation of the polymerization, as compared with the near-ultraviolet irradiation intensity employed for initiating the polymerization is preferably not more than 10 W/m$^2$. When it is above 10 W/m$^2$, the reaction may not be controlled. It is more preferably not more than 9 W/m$^2$, still more preferably not more than 7 W/m$^2$, most preferably not more than 5 W/m$^2$.

In the above mode (1), the period from the start of near-ultraviolet irradiation to the time of reducing the near-ultraviolet irradiation intensity, after initiation of the polymerization, lower than the near-ultraviolet irradiation intensity employed for initiation the polymerization is preferably not shorter than 1 second but not longer than 5 minutes, more preferably not shorter than 10 seconds, still more preferably not shorter than 30 seconds, but more preferably not longer than 3 minutes, still more preferably not longer than 2 minutes.

In the mode in which the photoirradiation intensity is gradually reduced after initiation of the polymerization of the above mode (1), the photoirradiation may be discontinued by reducing the photoirradiation intensity finally to 0 W/m$^2$. In this case, the period from the start of reduction in photoirradiation intensity to the time when the photoirradiation intensity becomes 0 W/m$^2$ is preferably not shorter than 10 seconds but not longer than 60 minutes. It is more preferably not shorter than 20 seconds, still more preferably not shorter than 30 seconds. On the other hand, it is more preferably not longer than 45 minutes, still more preferably not longer than 30 minutes.

In the above mode (2), the near-ultraviolet irradiation intensity when ultraviolet irradiation intensity is reduced (in case that photoirradiation intensity is made weak) as compared with that at the time of initiation of the polymerization is preferably not higher than 10 W/m$^2$, more preferably not higher than 7 W/m$^2$, still more preferably not higher than 5 W/m$^2$. When it exceeds 10 W/m$^2$, the reaction may not be controlled. When the near-ultraviolet irradiation intensity is increased (in case that photoirradiation intensity is made strong) as compared with the above-mentioned reduced photoirradiation intensity, the near-ultraviolet irradiation intensity is preferably not lower than 0.1 W/m$^2$ but not higher than 100 W/m$^2$. When it is lower than 0.1 W/m$^2$, the polymerization will not proceed well, possibly resulting in inefficient production. When it exceeds 100 W/m$^2$, anomalous reactions, inclusive of bumping, may occur. It is more preferably not lower than 1 W/m$^2$, still more preferably not lower than 3 W/m$^2$. On the other hand, it is more preferably not higher than 50 W/m$^2$, still more preferably not higher than 30 W/m$^2$.

In the above mode (2), the number of repeated changes in photoirradiation intensity between strong and weak (including the case where the photoirradiation intensity is zero), namely the number of such changes with the change in photoirradiation intensity from strong to weak being counted as once, may be selected according to the concentration and photoirradiation intensity at the time of polymerization and other factors but is preferably not less than once, more preferably not less than twice, still more preferably not less than 3 times. The period during which the photoirradiation intensity is strong and that during which the intensity is weak (including the state in which the photoirradiation intensity is zero) each preferably is not shorter than 1 second but not longer than 3 minutes, more preferably not shorter than 10 seconds but not longer than 1 minute.

Preferred as the method of repeatedly changing the photoirradiation intensity between strong and weak (including the state where the photoirradiation intensity is zero) in the above mode (2) are (2-1) the method comprising repeatedly changing the intensity of near-ultraviolet irradiation irradiated to the reaction mixture between strong and weak (including the state in which the photoirradiation intensity is zero) by inserting and removing a light shielding plate between the near-ultraviolet generation site and the reaction mixture, and (2-2) the method comprising repeatedly changing the intensity of near-ultraviolet irradiation irradiated to the reaction mixture between strong and weak (including the state in which the photoirradiation intensity is zero) by feeding the reaction mixture on a continuously running belt and irradiating the reaction mixture from above with near-ultraviolet rays at a constant intensity with a strongly light shielding plate and/or a weakly light shielding plate provided on at least one site between the reaction mixture upper surface and the near-ultraviolet generation site. Among them, the method (2-2) is more preferred.

Suited for use as the above-mentioned near-ultraviolet generation site, namely the apparatus for irradiating the reaction mixture with near-ultraviolet rays, are the same ones as mentioned hereinabove.

The site(s) for providing a strongly light shielding plate and/or a weakly light shielding plate in carrying out the above method (2-2) may adequately be selected depending on the belt operating speed, the intensity of photoirradiation irradiated to the reaction mixture, and so forth. It is preferable to dispose a plurality of such plates at regular intervals between the reaction mixture on the belt and the near-ultraviolet generation site.

Referring to FIGS. 1 to 4, a mode of carrying out the method of producing a (meth)acrylic acid based water-soluble polymer according to the invention is described. In FIGS. 1 to 4, 6 is an arrow indicating the direction of photoirradiation, and 7 is an arrow indicating the direction of running of the belt.

In the mode shown in FIG. 1 in which light shielding plates are disposed at regular intervals, the light shielding plates 3 are disposed at regular intervals between a continuous substrate belt 1 and ultraviolet lamps 2. In this case, when the belt 1 is operated, the reaction mixture moves under the light shielding plates 3. When near-ultraviolet rays are irradiated at a constant intensity from the ultraviolet lamps 2, the reaction mixture is irradiated with near-ultraviolet rays at that constant intensity while it passes the place where there is no light shielding plate 3 and, while it passes the place where there is provided with a light shielding plate 3, the intensity of near-ultraviolet rays with which the reaction mixture is irradiated is lowered. Therefore, by moving the reaction mixture by means of the belt 1 for its passing through light shielding plate-provided sites and light shielding plate-free sites alternately, it becomes possible to repeatedly change the photoirradiation intensity between strong and weak. Thus, the light shielding plates 3 disposed at regular intervals make it possible for the composition for polymerization on the belt 1 to be subjected to photoirradiation intermittently; repeated strengthening and weakening of photoirradiation intensity are thus realized.

FIG. 2 shows a mode in which strongly light shielding plates and weakly light shielding plates are disposed continuously. The strongly light shielding plates 4 and weakly light shielding plates 5 are disposed continuously at regular intervals between a continuous substrate belt 1 and ultraviolet lamps 2. In this case, too, it is possible to repeatedly change the photoirradiation intensity between strong and weak.

As for the intervals for disposing the light shielding plates 3, or strongly light shielding plates 4 and weakly light shielding plates 5, it is only required that the plates be disposed so as to realize substrate irradiation with ultraviolet rays and shielding or photoirradiation intensity reduction; thus, it is not always necessary to dispose the plates at regular intervals.

As for the shape of the belt to be used in a production apparatus for carrying out the above method (2-2), a boat configuration is preferred. In FIG. 3, a boat-shaped belt 8 is used as the continuous substrate belt 1 in FIG. 1 and, in FIG. 4, a boat-shaped belt 8 is used as the continuous substrate belt 1 in FIG. 2. FIG. 5(a) is a schematic representation of the boat-shaped belt 8 shown in FIG. 3 or FIG. 4, and FIG. 5(b) is a schematic representation of the same belt in section along X–X' in FIG. 5(a).

The above-mentioned boat configuration as the form of the belt is a preferred mode of embodiment in the practice of the invention since the boat configuration makes it easy to feed and retain the reaction mixture according to the invention, which comprises a monomer(s), a chain transfer agent and a polymerization solvent, on the belt. Any form other than the boat form may also be adapted as the belt for use in the photopolymerization according to the invention if it is a form capable of retaining the reaction mixture on the belt. A weir may be provided at the end of the belt in the direction of progress of the belt.

The length of the belt in actual production apparatus for carrying out the above method (2-2) is preferably not shorter than 1 m but not longer than 50 m. It is more preferably not shorter than 2 m, still more preferably not shorter than 3 m.

On the other hand, it is more preferably not longer than 40 m, still more preferably not longer than 30 m.

The operating speed of the above belt is preferably not lower than 3 cm/min but not higher than 10 m/min. It is more preferably not lower than 4 cm/min, still more preferably not lower than 5 cm/min. On the other hand, it is more preferably not higher than 7 m/min, still more preferably not higher than 5 m/min.

The strongly light shielding plates to be used according to the above method (2-2) are those by which light is shielded to a relatively high extent, including those light shielding plates which do not allow light transmission at all. The weakly light shielding plates are those by which light is shielded to a relatively small extent. The light shielding plates of each type may be of one kind or of two or more kinds. The number of such light shielding plates may vary according to the intended number of repeated strong/weak changes, the belt operating speed, the photoirradiation intensity in irradiating the reaction mixture and so forth, however, the number is preferably not less than 1 but not more than 100. It is more preferably not less than 5, still more preferably not less than 10. On the other hand, it is more preferably not more than 70, still more preferably not more than 50.

In carrying out the above method (2-2), the width of the light shielding plates in the direction of progress of the belt is preferably not less than 1 cm but not more than 5 m. More preferably, it is not less than 2 cm, still more preferably not less than 2.5 cm. On the other hand, it is more preferably not more than 3 m, still more preferably not more than 2 m. The intervals for disposition of two neighboring light shielding plates is preferably within the same range as mentioned above for the width of light shielding plates, more preferably the same as the width of the light shielding plates to be disposed.

The polymerization method in the above-mentioned photopolymerization step is preferably the manner of solution polymerization in water used as the polymerization solvent. The aqueous solution polymerization is preferably carried out in a state in which the dissolved oxygen in the aqueous solution has been removed in advance by bubbling with nitrogen gas, for instance. As for the polymerization procedure, it may be either a batchwise or continuous one, however, the stationary polymerization method is preferred. The belt polymerization is one mode of the stationary polymerization techniques.

The polymerization conditions in the above photopolymerization step may adequately be selected according to the (meth)acrylic acid monomer-containing monomer composition, the photopolymerization initiator and the chain transfer agent, and the amounts thereof. For example, the time from the start of near-ultraviolet irradiation to the completion of the reaction in the photopolymerization step is preferably not shorter than 1 minute but not longer than 90 minutes, more preferably not longer than 60 minutes, still more preferably not longer than 30 minutes.

The polymerization temperature in the photopolymerization step is preferably not lower than $-5°$ C. but not higher than 150° C., more preferably not higher than 120° C. The temperature at the time of initiating the polymerization is preferably not higher than 50° C., more preferably not higher than 30° C., still more preferably not higher than 20° C. A lower polymerization temperature is free from the risk of the occurrence of bumping, excursion of polymerization or other uncontrolled reactions, hence is advantageous from the productivity standpoint. The polymerization temperature mentioned above serves also as an effective factor in improving the physical properties of the product water-soluble polymer.

The polymer obtained in the photopolymerization step according to the production method of the present invention, when dried at 50° C. to 200° C., gives the (meth)acrylic acid based water-soluble polymer in dry form. In drying the polymer, the surface area of the polymer may be extended by cutting, for instance, and/or the drying is preferably carried out under reduced pressure. A drying temperature below 50° C. may result in insufficient drying of the polymer. In the case of an acid form (meth)acrylic polymer with a low neutralization degree, a drying temperature exceeding 150° C. may cause thermal crosslinking of the polymer and thus increase the insoluble matter content. At temperatures higher than 180° C., the main chain and/or crosslinking sites of the polymer may be cleaved and the quality thereof may be deteriorated. The drying time may adequately be selected according to the content of water in the polymer and the drying temperature, etc.

In a preferred mode of the (meth)acrylic acid based water-soluble polymer according to the invention, the proportion of neutralized groups contained in the water-soluble polymer is not higher than 90 mole percent. The above proportion is calculated with the sum of acid groups and groups in a neutralized form as contained in the water-soluble polymer being taken as 100 mole percent. The groups in a neutralized form are groups resulting from replacement of hydrogen ions dissociable from the acid groups with other cations, and there may be mentioned groups in salt form resulting from neutralization of acid groups with an alkali metal, for instance. In a more preferred form, the sum of the acid group-containing monomer component and the neutralized form group-containing monomer component in the monomer composition used for the production of the (meth)acrylic acid based water-soluble polymer of the invention is taken as 100 mole percent, and the proportion of the neutralized form group-containing monomer component is calculated and expressed in terms of mole percent. It is also possible to attain a proportion of neutralized form groups contained in the water-soluble polymer, which is not higher than 90 mole percent, by neutralizing the water-soluble polymer obtained after polymerization. However, the water-soluble polymer has a high intrinsic viscosity and/or weight average inertial radius, so that it is difficult in some cases to neutralize the polymer in its as-produced condition. If necessary, the polymer obtained may be diluted with water and then neutralized using the required amount of an alkali.

Those (meth)acrylic acid based water-soluble polymers which have a neutralized group content of less than 20 mole percent with the sum of acid groups and neutralized groups contained in the (meth)acrylic acid based water-soluble polymer in question being taken as 100 mole percent, shows an intrinsic viscosity of 30 to 120 ml/mmol at 30° C. in a 2 N aqueous solution of sodium hydroxide in the form of a neutralization product derived from the polymer by neutralization of all acid groups thereof with sodium hydroxide, and have a deionized water-insoluble matter content of less than 5% by mass can produce good flocculating and/or thickening effects, hence can suitably be used in various fields of application. Such (meth)acrylic acid based water-soluble polymers constitute an aspect of the present invention.

The (meth)acrylic acid based water-soluble polymers in the above aspect of the invention have a neutralized group content of less than 20 mole percent with the sum of acid groups and neutralized groups which the polymer has being taken as 100 mole percent. Thus, the neutralization degree is less than 20 mole percent. Among such acid form (meth) acrylic acid based water-soluble polymers, the wholly unneutralized ones (namely having a neutralization degree of 0%) have all groups in question remaining in acid form.

It is a characteristic feature of such water-soluble polymers according to the invention that the proportion of neutralized groups is less than 20 mole percent, where the sum of acid groups and neutralized groups contained in the water-soluble polymer is taken as 100 mole percent.

The proportion of neutralized groups contained in the water-soluble polymer of the invention is determined in the following manner. For example, when the monomer component forming an acid form (meth)acrylic acid based water-soluble polymer as used for the production of that polymer comprises x moles of acrylic acid, y moles of sodium acrylate as a salt of acrylic acid, and z moles of methyl acrylate as an acrylate ester and when it is supposed that all of these are polymerized, the proportion can be calculated according to the formula given below, since the acrylate ester is neither ionic nor in a neutralized form.

The denominator is the sum, in number of moles, of the acid group-containing starting monomer component and the neutralized group (here, in a neutralized salt form resulting from neutralization of acid groups with an alkali metal or the like)-containing starting monomer component. The numerator is the number of moles of the neutralized group (here, in a neutralized salt form resulting from neutralization of acid groups with an alkali metal or the like)-containing starting component. These are applied to the formula given below to give the content of the groups in neutralized form in percentage, therefore, the unit is in mole percentage. In the present invention, the proportion of groups in neutralized form, as represented by the following formula, is sometimes referred as neutralization degree.

(Proportion of groups in neutralized form)=
  [y/(x+y)]×100 where x moles: AA (acrylic acid)
  y moles: SA (sodium acrylate)
  z moles: AM (methyl acrylate).

When the monomer component forming an acid form (meth)acrylic acid based water-soluble polymer comprises α moles of acrylic acid, β moles of sodium 2-acrylamide-2-methylpropanesulfonate and γ moles of acrylamide and when it is supposed that all of these are polymerized, the proportion is calculated according to the formula given below, since the acrylamide is neither ionic nor in a neutralized form.

In the following formula, the numbers of moles of the acid group-containing starting monomer components are used in the denominator and numerator in the same manner as in the formulas given above. When these are applied to the following formula, the proportion of the groups in neutralized form is calculated in percentage, therefore, the unit is in mole percentage.

(Proportion of groups in neutralized form)=[β/(α+β)]×100 where α moles: AA (acrylic acid)
  β moles: AMPS-Na (sodium 2-acrylamide-2-methylpropanesulfonate)
  γ moles: AAm (acrylamide).

Further, when the monomer component forming an acid form (meth)acrylic acid based water-soluble polymer comprises a moles of sodium acrylate, b moles of 2-acrylamide-2-methylpropanesulfonic acid and when it is supposed that all of these are polymerized, the proportion is calculated according to the formula given below.

In the following formula, the numbers of moles of the acid group-containing starting monomer components are used in the denominator and numerator in the same manner as in the formulas given above. When these are applied to the following formula, the proportion of the groups in neutralized form is calculated in percentage, therefore, the unit is in mole percentage.

(Proportion of groups in neutralized form)=
  [a/(a+b)]×100 where a moles: SA (sodium acrylate)
  b moles: AMPS (2-acrylamide-2-methylpropanesulfonic acid).

When it has an intrinsic viscosity of less than 30 ml/mmol, the above acid form (meth)acrylic acid based water-soluble polymer cannot exhibit the flocculating or thickening effect to a full extent, hence cannot be adequately used in various fields of application. When it is used as, for example, a dug soil treating agent, it cannot modify a hydrous soil into a soil high in strength at low addition amounts. When it is used as a cataplasm additive, it cannot give high levels of adhesiveness and shape retentivity. When the intrinsic viscosity exceeds 120 ml/mmol, the polymer becomes difficult to handle and also becomes difficult to produce. The expression "mmol" indicates "millimoles".

The intrinsic viscosity is preferably within a range not lower than 60 ml/mmol. In this case, the preferable range is 60 to 120 ml/mmol, more preferably not lower than 70 ml/mmol, still more preferably not lower than 80 ml/mmol, most preferably not lower than 90 ml/mmol.

The intrinsic viscosity can be determined, for example, by measuring the relative viscosity, specific viscosity and reduced viscosity using a kinematic viscometer.

The above (meth)acrylic acid based water-soluble polymers having a neutralization degree of less than 20 mole percent can be produced by the method comprising photopolymerizing a monomer component comprising a (meth)acrylic acid monomer(s) or the method comprising thermally polymerizing such monomer composition, however, for the reasons mentioned above, the method of producing (meth)acrylic acid based water-soluble polymers by photopolymerization manner is preferred. The (meth)acrylic acid based water-soluble polymer produced by the above-mentioned method of producing a (meth)acrylic acid based water-soluble polymer by photopolymerization constitutes one of the preferred embodiments of the present invention.

The polymerization initiator to be used in the thermal polymerization mentioned above specifically includes hydrogen peroxide; persulfate salts such as sodium persulfate, potassium persulfate and ammonium persulfate; azo compounds such as 2,2'-azobis-(2-amidinopropane)dihydrochloride, 2,2'-azobis[2-(2-imidazolin)-2-yl]propane]dihydrochloride, 4,4'-azobis(4-cyanovaleric acid), 2,2'-azobisisobutyronitrile, and 2,2'-azobis(4-methoxy-2,4-dimethylvaleronitrile); and organic oxides such as benzoyl peroxide, lauroyl peroxide, peracetic acid, persuccinic acid, di-tert-butyl peroxide, tert-butyl hydroperoxide and cumene hydroperoxide; and like radical polymerization initiators. These polymerization initiators may be used singly or two or more species may be used in combination. Among the polymerization initiators mentioned above as examples, azo compounds are particularly preferred. The polymerization initiators are used preferably in an amount within the range of 0.0001 g to 0.05 g per mole of the monomer component.

The (meth)acrylic acid based water-soluble polymer produced by the above-mentioned method of producing (meth) acrylic acid based water-soluble polymer which has a content of groups in neutralized form of not more than 90 mole percent, more preferably 20 to 80 mole percent, with the sum total being taken as 100 mole percent; acid groups and groups in neutralized state which the (meth)acrylic acid based water-soluble polymer in question has, has a weight average inertial radius upon complete neutralization of not less than 160 nm and has an insoluble matter content in deionized water of less than 5% by mass can be used in various fields of application. When used as dug soil treating agents, it is excellent in safety and can modify a hydrous soil into a highly strong soil at low addition amounts and, when used as a cataplasm additive, it can exhibit high levels of adhesiveness and shape retentivity. Such partially neutralized (meth)acrylic acid based water-soluble polymers also constitute one of the preferred embodiments of the present invention.

Such partially neutralized (meth)acrylic acid based water-soluble polymers which are partially neutralized and in a salt form are also referred to as partially neutralized salts or partially neutralized polymers.

The neutralization degree of such a (meth)acrylic acid based water-soluble polymer having a neutralized group content of 20 to 80 mole percent can be determined in the same manner as mentioned above referring to the acid form (meth)acrylic acid based water-soluble polymers having a neutralization degree of less than 20 mole percent.

When its weight average inertial radius upon complete neutralization is less than 160 nm, the above partially neutralized (meth)acrylic acid based water-soluble polymer cannot be adequately used in various fields of application. When such a polymer is used as a dug soil treating agent, it cannot modify a hydrous soil into a soil with a high strength at low addition amounts. When used as a cataplasm additive, it cannot give high levels of adhesiveness and shape retentivity. When the radius exceeds 300 nm, the polymer becomes difficult to handle and also becomes difficult to produce. The weight average inertial radius is described in "Kobunshi Jiten (Dictionary of Polymers)", edited by the Society of Polymer Science, Japan, published 1985 by Asakura Shoten. 9th printing, pages 45–49. It is also described in detail in the article by G. C. Berry et al., The Journal of Chemical Physics, Vol. 44, No. 12 (1966), pages 4550 to 4564.

The above-mentioned weight average inertial radius is preferably within the range not less than 180 nm. In this case, the range is within 180 to 300 nm. It is more preferably not less than 190 nm, still more preferably not less than 200 nm, most preferably not less than 210 nm. On the other hand, it is more preferably not more than 280 nm, still more preferably not more than 260 nm.

The weight average inertial radius can be determined by preparing a solution of the neutralization product derived from the partially neutralized (meth)acrylic acid based water-soluble polymer in question by complete neutralization and measuring the refractive index and intensity of light scattering of the neutralization product. A detailed method of calculation will be described later herein. "Complete neutralization" means that all dissociable hydrogen ions in acid groups of the partially neutralized (meth)acrylic acid based water-soluble polymer are substituted by other cations. In the practice of the invention, the other cations include sodium ions, potassium ions and so forth provided that the weight average inertial radius upon complete neutralization falls within the range mentioned above. The neutralization can be performed in the conventional manner.

As regards the method of adjusting the content of groups in neutralized form in the (meth)acrylic acid based water-soluble polymer (neutralization degree) to a value within the range mentioned above, the neutralization degree is preferably adjusted by appropriately selecting the ratio between acid type monomer(s) and salt type monomer(s), as mentioned above; however, it may be such a mode of reaction as carrying out the polymerization while neutralizing the acid type monomer(s) or the polymer by adding a basic compound or the like during polymerization of the acid type monomer(s).

In the above-mentioned method of producing a (meth) acrylic acid based water-soluble polymer according to the invention, a chain transfer agent is used and, at the same time, the conditions are adjusted so that the monomer concentration at the time of photopolymerization may be within a specific range. More specifically, the monomer component concentration in the polymerization reaction mixture to be submitted to polymerization is preferably within the range of 40 to 97% by mass, more preferably 50 to 95% by mass. The lower limit is still more preferably not less than 55% by mass, further preferably not less than 60% by mass, particularly preferably not less than 65% by mass, most preferably not less than 70% by mass. As for the upper limit, it is still more preferably not more than 90% by mass.

When the monomer concentration is within the above range, the intrinsic viscosity or weight average inertial radius of the (meth)acrylic acid based water-soluble polymer of the invention can be increased, as mentioned above, and, at the same time, the insoluble matter content can be reduced. Therefore, when used as a dug soil treating agent or a cataplasm additive, the polymer shows good physical properties which can hardly be obtained by the conventional methods of production. As for the above insoluble matter content, the above-mentioned acid form (meth)acrylic acid based water-soluble polymer with a neutralized group content (neutralization degree) of less than 20% by mole percent and the partially neutralized (meth)acrylic acid based water-soluble polymer with a neutralization degree of 20 to 80 mole percent have an insoluble matter content in deionized water of less than 5% by mass. When the insoluble matter content in deionized water is not less than 5% by mass, no improvement in product quality will be achieved and, in addition, no sufficient effects will be produced. The above insoluble matter content is the value obtained by adding 1.0 g of the above (meth)acrylic acid based water-soluble polymer to 500 g of deionized water, stirring the mixture at 25° C. for 2 hours, filtering the mixture through a 32-mesh filter to separate the insoluble matter in hydrous state, and performing a calculation according to the following calculation formula:

Insoluble matter content(% by mass)={mass (g) of insoluble matter/500 (g)}×100.

The insoluble matter content referred to herein is the value measured within 1 minute after filtration of the (meth)acrylic acid based water-soluble polymer in the aqueous solution through the above filter. The filtration and weighing are carried out under conditions of 25° C. and a humidity of not lower than 60%.

In the case of acid form (meth)acrylic acid based water-soluble polymers with a neutralization degree of less than 20 mole percent, the above insoluble matter content is preferably within the range less than 4% by mass, more preferably less than 3% by mass, still more preferably less than 2% by mass, particularly preferably less than 1% by mass, most preferably less than 0.5% by mass. In the case of partially neutralized (meth)acrylic acid based water-soluble polymers with a neutralization degree of 20 to 80 mole percent, it is preferably less than 4% by mass, more preferably less than 3% by mass, still more preferably less than 2% by mass, most preferably less than 1% by mass. When the insoluble matter content is high, the aqueous solution upon dissolving the water-soluble polymer to the aqueous solution may show an increased viscosity and/or the tackifying and/or flocculating effect of the water-soluble polymer may not be produced to a full extent in some instances. Thus, problems arise: when the polymer is used as a dug soil treating agent, the soil modifying performance characteristics may not be sufficient or, when it is used as a cataplasm additive, stable adhesiveness cannot be secured but peeling or rather excessive sticking may result under certain use conditions.

The above (meth)acrylic acid based water-soluble polymer is preferably one obtained by polymerizing a monomer component containing the above-mentioned 2-acrylamide-2-methylpropanesulfonic acid (salt) and/or 3-allyloxy-2-hydroxypropanesulfonic acid (salt).

The present invention is further concerned with a dug soil treating agent comprising the above (meth)acrylic acid based water-soluble polymer as a main component.

The dug soil treating agent is added to a hydrous soil resulting from digging engineering to give a solidified product in granular form; when the (meth)acrylic acid based water-soluble polymer according to the invention is used, a high level of safety can be secured and a hydrous soil can be modified to a soil with high in strength at a low addition amount.

That the dug soil treating agent according to the invention comprises the (meth)acrylic acid based water-soluble polymer as a main component thereof means that it contains not less than 50% by mass, preferably not less than 60% by mass, more preferably not less than 70% by mass, still more preferably not less than 80% by mass, of the (meth)acrylic acid based water-soluble polymer per 100% by mass of the dug soil treating agent.

As the hydrous soil to which the above-mentioned dug soil treating agent is to be applied, there may be mentioned sludge as a sludge cake or the like obtained by separation of a soil resulting from digging upon excavation by the underground continuous wall method or slurry shield method, for instance, into a soil and sand fraction and a slurry fraction, followed by solid-liquid separation of the slurry by means of a dewatering press or the like; sludge as a sediment obtained by allowing slurry resulting from a construction work to stand in a sedimentation tank; surplus excavation soil, surplus soft soil; hydrous screenings and like slurry generated in quarries and stone crushing plants; clay and silt. Such hydrous soils may contain bentonite and so on. They preferably have a moisture content of 20 to 200% as determined by the moisture content measurement method according to JIS A 1203. The moisture content is calculated by the following formula:

{water (g)/solid matter (g) in hydrous soil}×100.

When it exceeds 200%, the water content is excessive, so that the dug soil treating agent is required in an increased amount, possibly resulting in increases in cost.

The (meth)acrylic acid based water-soluble polymers of the present invention can cope with hydrous soils rich in cohesive volcanic ash soil, silt, clay and the like and difficult to convert to a granular solidification product among the hydrous soils mentioned above. By applying the (meth) acrylic acid based water-soluble polymers of the invention, it becomes possible to reuse such soils. When those hydrous soils which are generally discarded as sludge are treated with them, it becomes possible to transport such soils by truck, for instance. Furthermore, environmental preservation, resources savings, prolongation of the life of disposal sites, and reductions in cost of hydrous soil disposal become possible.

In the case of those (meth)acrylic acid based water-soluble polymers which has a neutralization degree of less than 20 mole percent, the addition amount thereof to hydrous soil is preferably such that the (meth)acrylic acid based water-soluble polymer accounts for not less than 0.01 part by weight but not more than 5 parts by weight per 100 parts by weight of hydrous soil. When the addition amount is less than 0.01 part by weight, the polymer may fail to modify soil to a sufficient extent and, when it exceeds 5 parts by weight, the modifying effect no more increases. More preferably, the addition amount is not less than 0.02 part by weight but not more than 1 part by weight. In the case of those (meth)acrylic acid based water-soluble polymers which have a neutralization degree of 20 to 80 mole percent, the addition amount is preferably such that such a (meth) acrylic acid based water-soluble polymer accounts for not less than 0.02 part by weight but not more than 5 parts by weight per 100 parts by weight of hydrous soil. When the addition amount is less than 0.02 part by weight, the polymer may fail to modify soil to a sufficient extent and, when it exceeds 5 parts by weight, the modifying effect no more increases. More preferably, the addition amount is not less than 0.03 part by weight but not more than 1 part by weight.

The content of the (meth)acrylic acid based water-soluble polymers in such dug soil treating agents as mentioned above can be selected in a manner such that their addition amount is within the above range and no problems will arise upon usage. If necessary, the hydrous soil containing the dug soil treating agent may be further treated by adding a hydraulic substance, specifically cement, quicklime, hydrated lime, gypsum or the like, or a mixture of these.

The present invention is also concerned with a cataplasm additive comprising the above-mentioned (meth)acrylic acid based water-soluble polymer as a main component. The cataplasm includes, for example, the form of utilization as sheet-shaped fomentations for relieving sprain or inflammation at affected sites and the form of utilization as antipyretic sheets to be attached to the skin for declining the fever (alleviation of fever). The form of utilization as fomentations mentioned above is generally formulated with a medicinal ingredient(s) such as methyl salicylate, peppermint oil, indomethacin and/or the like, and are used for the purpose of relieving inflammation of the like at affected sites. In any of the application forms, the (meth)acrylic acid based water-soluble polymer of the invention may be evaluated in terms of those physical properties which cataplasms should preferably have, namely adhesiveness as a criterion for judging the degree of easiness of attachment to the skin, and shape retentivity as a criterion for judging the convenience of using.

Referring to the cataplasm additive according to the invention, "comprising the (meth)acrylic acid based water-soluble polymer as a main component" means that cataplasm additive, which is taken as 100% by mass, contains not less than 0.01% by mass of the (meth)acrylic acid based water-soluble polymer. The polymer content is preferably not less than 1% by mass, more preferably not less than 2% by mass, further preferably not less than 3% by mass. It is preferably not more than 30% by mass, more preferably not more than 10% by mass.

The above-mentioned cataplasm additive is added to a cataplasm base for providing cataplasms with adhesiveness. When the (meth)acrylic acid based water-soluble polymer of the invention is used, high levels of adhesiveness and shape retentivity can be exhibited.

The addition amount of the above cataplasm additive to a cataplasm base in the case of the (meth)acrylic acid based water-soluble polymer of which the content of groups in neutralized form is less than 20 mole percent, where the sum total of the acid groups and neutralized groups in the (meth)acrylic acid based water-soluble polymer is taken as 100 mole percent, namely the (meth)acrylic acid based water-soluble polymer having a neutralization degree of less than 20 mole percent, is preferably such that the (meth) acrylic acid based water-soluble polymer amounts to not less than 0.01 part by weight but not more than 30 parts per 100 parts by weight of the cataplasm base. When the addition amount is less than 0.01 part by weight, it may be impossible to thicken the cataplasm base to exhibit high levels of adhesiveness and shape retentivity, and when it exceeds 30 parts by weight, the thickening effect will hardly increase any longer. More preferably, it is not less than 3 parts by weight but not more than 10 parts by weight. In the case of the above-mentioned (meth)acrylic acid based water-soluble polymer having a neutralization degree of 20 to 80 mole percent, the addition amount is preferably such that the (meth)acrylic acid based water-soluble polymer amounts to not less than 0.02 part by weight but not more than 30 parts by weight per 100 parts by weight of the cataplasm base. When the addition amount is less than 0.02 part by weight, it may be impossible to thicken the cataplasm base to provide the same with high levels of adhesiveness and shape retentivity, and when it exceeds 30 parts by weight, the thickening effect will hardly increase any longer. More preferably, it is not less than 2 parts by weight but not more than 10 parts by weight.

In the case of the cataplasm additive as well, the content of the (meth)acrylic acid based water-soluble polymer of the invention in the cataplasm additive may adequately be selected according to a formulation resulting in such an addition amount as mentioned above so that no problem may arise in using the cataplasms.

The (meth)acrylic acid based water-soluble polymers according to the invention can suitably be used in various fields of application, for example as dug soil treating agents, cataplasm additives, dredged soil treating agents and so on; and since they produce good flocculating and thickening effects, they are suitably used as a main component of dug soil treating agents and cataplasm additives, as mentioned above. When they are used as dug soil treating agents, hydrous soils can be converted to soils with high strength at low addition levels, with high safety and, when they are used in cataplasm additives, high levels of adhesiveness and shape retentivity can be attained.

The (meth)acrylic acid based water-soluble polymer according to the invention is excellent in adhesiveness, thickening effects and flocculating effects, so that they can be used not only in the above-mentioned fields of application as soil treating agents and cataplasm additives but also as thickeners, cold insulators, adhesives, paper strength additives, flocculants, food additives and so forth.

In preparing cataplasms, known additives, in desired respective amounts, may be compounded. As the additives other than the (meth)acrylic acid based water-soluble polymers of the invention as cataplasm additives, there may be mentioned glycols such as polypropylene glycol and glycerol, gelatin, surfactants, menthol and other perfumes, crosslinking agents such as aluminum chloride and zinc chloride, medicinal ingredients such as methyl salicylate, camphor, peppermint oil and indomethacin, pigments such as kaolin, and so forth. Thus, cataplasms prepared from the cataplasm additive comprising the (meth)acrylic acid based water-soluble polymer of the invention and other additives constitute an embodiment of the present invention.

BRIEF DESCRIPTION OF THE DRAWINGS

In FIGS. 6(b), (c) and (d), the numerical values in the parentheses indicate respective sizes of the polymerization vessel.

EXPLANATION OF SYMBOLS

Figure 1:
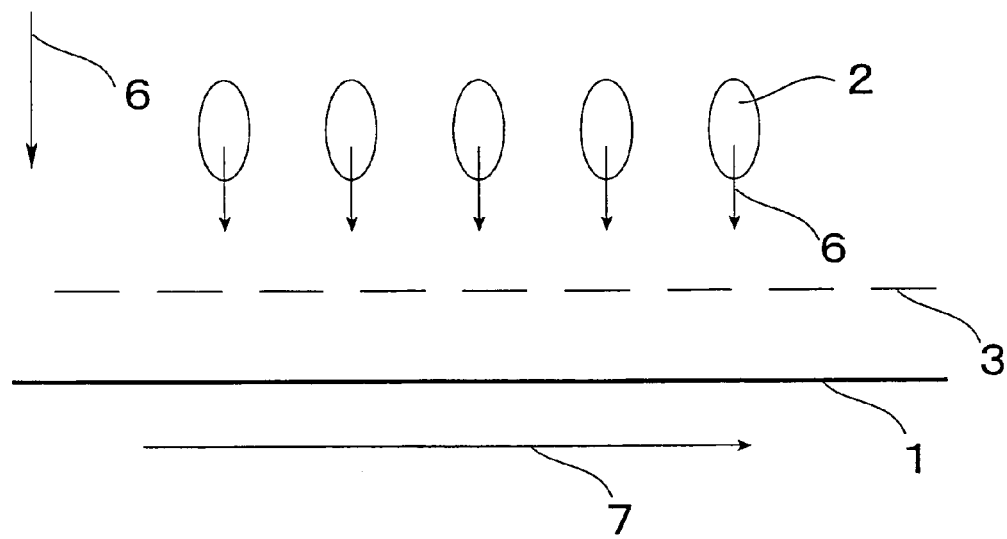
FIG. 1 is a schematic representation of a mode of embodiment of the method of producing a (meth)acrylic acid based water-soluble polymer according to the invention.
Figure 2:
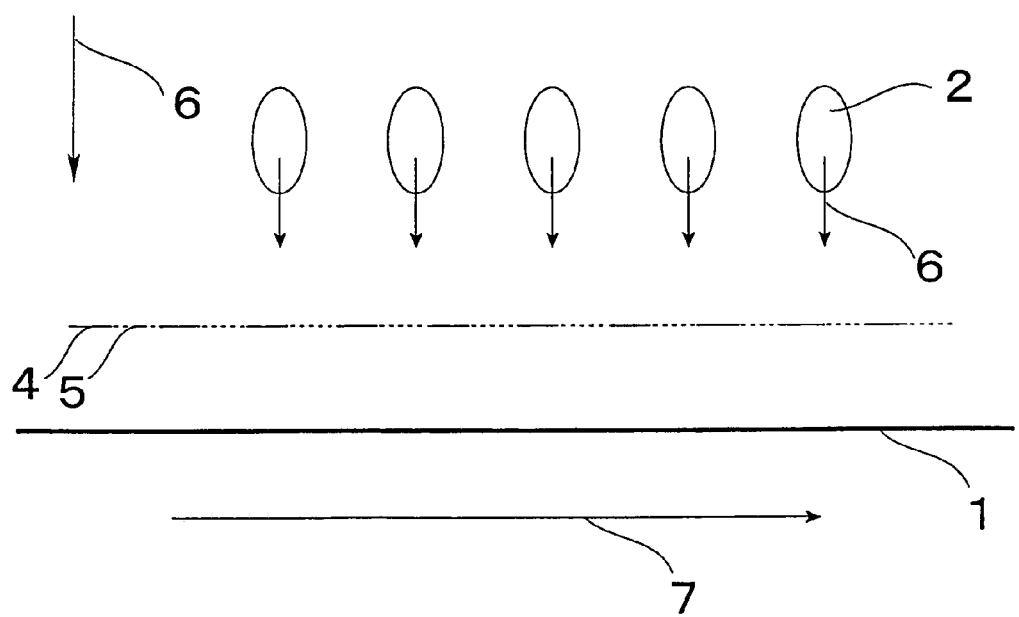
FIG. 2 is a schematic representation of another mode of embodiment of the method of producing a (meth)acrylic acid based water-soluble polymer according to the invention.
Figure 3:
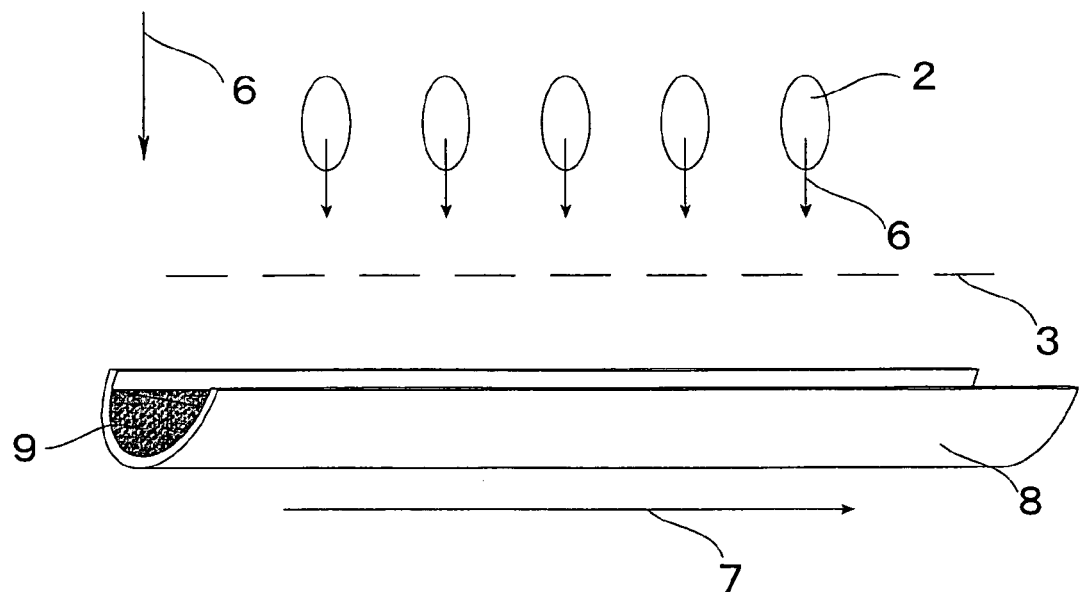
FIG. 3 is a schematic representation of a mode of embodiment of the method of producing a (meth)acrylic acid based water-soluble polymer according to the invention.
Figure 4:
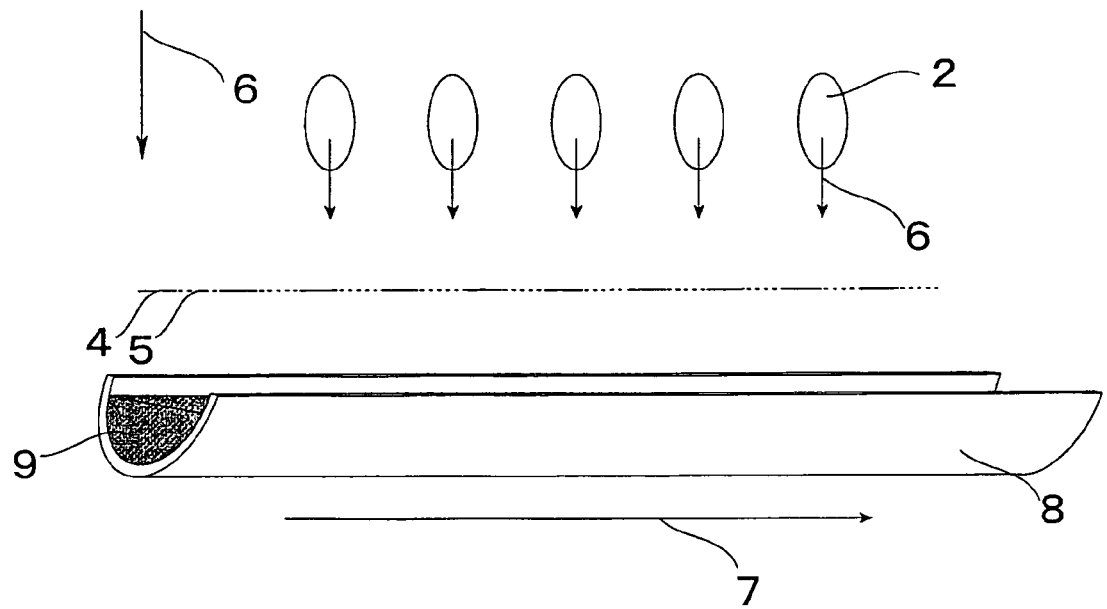
FIG. 4 is a schematic representation of another mode of embodiment of the method of producing a (meth)acrylic acid based water-soluble polymer according to the invention.
Figure 5:
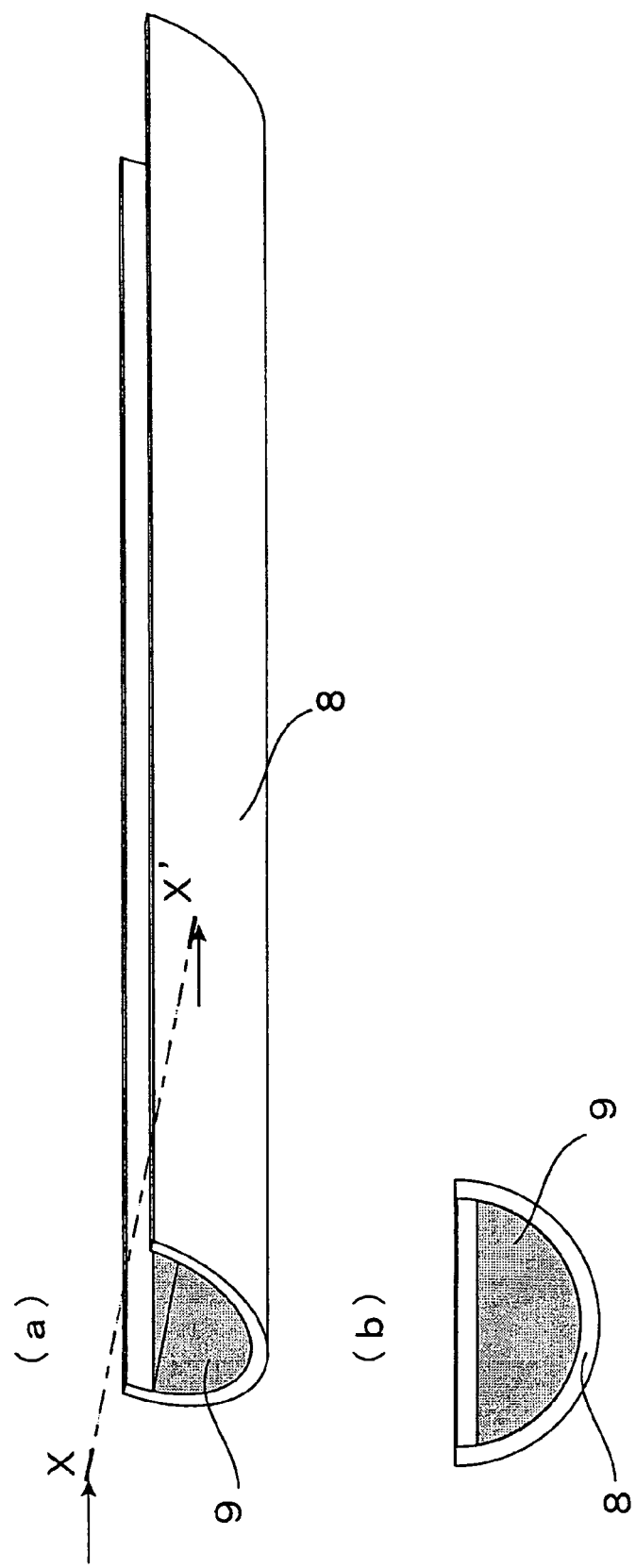
FIG. 5(a) is a schematic representation of a boat-shaped belt to be used in a mode of embodiment of the method of producing a (meth)acrylic acid based water-soluble polymer according to the invention, and (b) is a schematic representation, in cross section, of the boat-shaped belt.

1 Continuous substrate belt
2 Ultraviolet lamp
3 Light shielding plate
4 Strongly light shielding plate
5 Weakly light shielding plate
6 Direction of photoirradiation
7 Direction of progress of the belt
8 Continuous substrate belt (boat-shaped belt)
9 Reaction mixture
10 Upper part of polymerization vessel
11 Lower part of polymerization vessel
12, 13 Socket
14 Polymerization vessel
15 Lower part of vessel
16 Upper part of vessel (cover body)
17a Inlet opening 17b Opening for thermometer insertion
18 Packing

BEST MODES FOR CARRYING OUT THE INVENTION

The following examples illustrate the present invention in more detail. These examples are by no means limitative of the scope of the invention, however. Unless otherwise specified, "part(s)" means "part(s) by weight", and "%" means "% by mass".

Examples 1 to 63 are concerned with various modes of embodiment of the (meth)acrylic acid based water-soluble polymer of the invention. Among them, Examples 1 to 31 and Examples 61 to 66 are concerned with those (meth) acrylic acid based water-soluble polymers of which the proportion of groups in neutralized form contained in the water-soluble polymer is less than 20 mole percent while Examples 32 to 60 are concerned with those (meth)acrylic acid based water-soluble polymers in which the proportion of neutralized groups contained in the water-soluble polymers is 20 to 80 mole percent.

[A] Example of Water-Soluble Polymers having a Neutralized Group Content of less than 20 Mole Percent

EXAMPLE 1

A 500-ml stainless steel vessel was charged with 203.8 g of acrylic acid and 68.35 g of deionized water, and 23.6 g of a 48% aqueous solution of sodium hydroxide was added with cooling to give an aqueous solution of partially neutralized salt of acrylic acid. This aqueous solution of partially neutralized salt of acrylic acid was bubbled with nitrogen to thereby eliminate the dissolved oxygen. Then, the temperature of this aqueous solution was adjusted to 10° C. and, then, 1.41 g of a 2% aqueous solution of the photopolymerization initiator V-50 (product of Wako Pure Chemical Industries, azo photopolymerization initiator, chemical name: 2,2'-azobis-2-amidinopropane dihydrochloride) and 2.83 g of a 2% aqueous solution of sodium hypophosphite as a chain transfer agent were added, followed by uniform mixing to give a reaction mixture.

Acrylic acid and sodium acrylate were contained as monomers in this reaction mixture, and the proportion of the salt form monomer (sodium acrylate) in the whole monomer, namely the neutralization degree, was 10 mole percent. The monomer (acrylic acid plus sodium acrylate) concentration in this reaction mixture was 70% by mass. The addition amount of V-50 was 0.01 g per mole of the monomer. The addition amount of sodium hypophosphite was 0.02 g per mole of the monomer.

Figure 6:
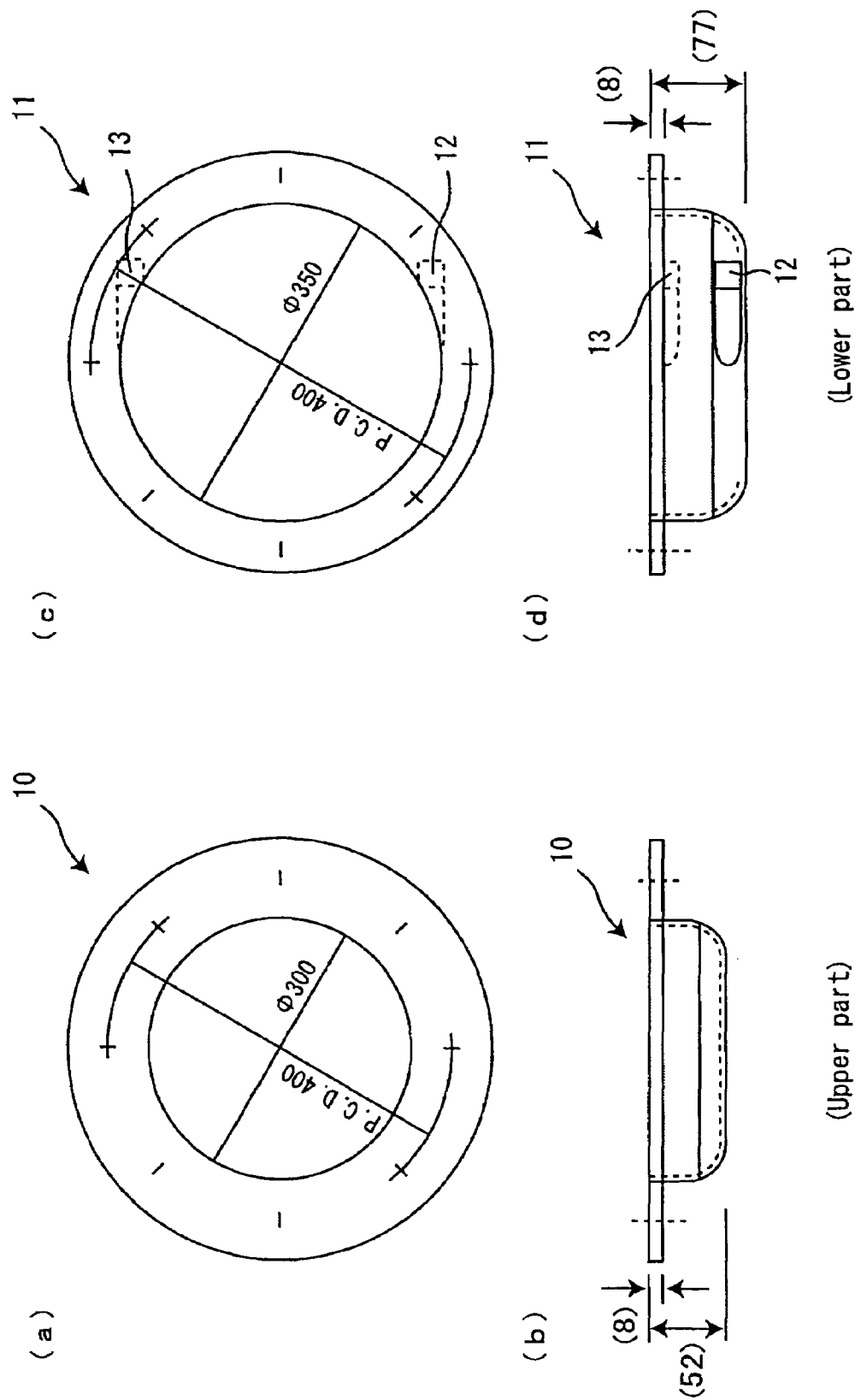
FIG. 6 is a schematic representation of a polymerization vessel used in Examples of the (meth)acrylic acid based water-soluble polymer of the invention; (a) is a plan view of the upper part 10 of the polymerization vessel, (b) is a side view of the upper part 10 of the polymerization vessel, (c) is a plan view of the lower part 11 of the polymerization vessel, and (d) is a side view of the lower part 11 of the polymerization vessel.

The polymerization vessel used in this Example was constituted of an upper part and a lower part. It is schematically shown in FIG. 6(a) is a plan view of the upper part 10 of the polymerization vessel, (b) is a side view of the upper part 10 of the polymerization vessel, (c) is a plan view of the lower part 11 of the polymerization vessel, and (d) is a side view of the lower part 11 of the polymerization vessel. This polymerization vessel is made of stainless steel (SUS 304), and the upper part 10 of the polymerization vessel is internally lined with Teflon (R). The lower part 11 of the polymerization vessel has a socket 12 for introducing cooling water or the like into a jacket and a socket 13 for discharging the same to give a structure such that cooling water or the like enters the jacket through the lower socket 12 and leaves there through the upper socket 13. In the example, the upper part 10 was put on the lower part 11 in a covering manner, and a packing was mounted, followed by fixation at 8 sites with bolts and nuts.

Cold water at 10° C. was introduced through the socket 12 on the lower part 11 of such polymerization vessel and discharged from the socket 13 and, at the same time, the upper part 10 of the polymerization vessel was covered with Saran Wrap and the space into which the reaction mixture was to be introduced was purged with nitrogen. Then, the reaction mixture was introduced into the upper part 10 of the polymerization vessel and irradiated with near-ultraviolet rays in the wavelength range of 300 to 450 nm at an intensity of 3 W/cm$^2$ for 15 minutes using a black light mercury lamp (product of Toshiba, model H400BL-L). Immediately after initiation of irradiation, the polymerization started. Then, the intensity was increased to 7 W/cm$^2$ and, after the lapse of 15 minutes, the temperature of cold water introduced through the socket 12 was raised to 80° C. The polymerization was driven to completion by maintaining the same temperature for 30 minutes. The thus-obtained gel-like polymer was assayed for residual monomer content by the bromine addition method. The content was 0.3 mole percent. The thus-obtained gel-like polymer was cut to pieces using scissors and dried under reduced pressure at 80° C. The dried product was ground in a desk grinder and then classified so as to pass through a 40-mesh sieve, whereby a polymer (1) comprising a partially neutralized salt of polyacrylic acid was obtained. At the time of cutting with scissors, the gel-like polymer could be cut with ease without adhering to the scissors. Further, the intrinsic viscosity and insoluble matter content of the polymer (1) were determined by the methods mentioned below. The results thus obtained are shown in Table 1.

Method of Determining Residual Monomer Content (Bromine Addition Method)

Deionized water (100 ml) and about 1 g (accurately weighed) of the polymer were placed in an iodine value measurement flask and allowed to stand for the whole day and night for attaining uniform dispersion. Thereafter, 25 ml of a 0.1 N solution of potassium bromate was added to the iodine value determination flask, 15 ml of 6 N hydrochloric acid was then added using a measuring cylinder, the flask was immediately stoppered, 10 ml of a 15% solution of potassium iodide was placed in the reservoir, and the whole was allowed to stand in the dark for 20 minutes. After standing, while cooling the iodine value determination flask on an ice bath, the stopper was loosened, and the potassium iodide solution was allowed to flow into the flask. After immediate stoppering and shaking, the stopper was taken off, and titration was carried out with a 0.1 N sodium thiosulfate solution. When the liquid assumed a pale orange color, about 1 ml of a 1% starch indicator solution was added. The time when the violet color disappeared was taken as the end-point. In a blank test, the same procedure was performed without using the polymer, and the titer was determined. The residual monomer content is calculated as follows:

$$\text{Residual monomer (mole percent)} = (B-A) \times 0.005 \times f / \text{number of moles of polymer}$$

where B: the consumption (ml) of the sodium thiosulfate solution when the polymer was used;
A: the consumption (ml) of the sodium thiosulfate solution in the blank test.

The number of moles of the polymer is the number of moles of the starting monomers constituting the polymer.

(Intrinsic Viscosity Determination Method)

(1) In a 200-ml Erlenmeyer flask was placed 2 mmol (in the case of polymer (1), 148.4 mg) of the sufficiently dried acid form (meth)acrylic acid based polymer as exactly weighed, 90 ml of deionized water was added, and the mixture was allowed to stand for 20 hours to allow the acid form (meth)acrylic acid based polymer to be dissolved to give an aqueous solution. Then, this aqueous solution was stirred for 2 hours using a magnetic stirrer, and all acid groups in the acid form polymer were then neutralized by adjusting the pH to 10.0 with sodium hydroxide. Then, the total volume was made 100 ml by adding deionized water, and the whole was filtered through a G-1 glass filter to remove the insoluble matter. A 0.02 mmol/ml aqueous solution of the acid form (meth)acrylic acid based polymer in neutralized form was thus obtained.

(2) Then, 50 ml of the aqueous solution of the neutralized acid form (meth)acrylic acid based polymer, obtained as described above under (1), was added to 50 ml of a 4 N aqueous solution of sodium hydroxide with stirring to give a 0.01 mmol/ml aqueous solution of the neutralized acid form (meth)acrylic acid based polymer in 2 N sodium hydroxide. The thus-obtained aqueous solution of the neutralized acid form (meth)acrylic acid based polymer was diluted with 2 N aqueous solution of sodium hydroxide to give (A) a 0.008 mmol/ml aqueous solution, (B) a 0.006 mmol/ml aqueous solution, (C) a 0.004 mmol/ml aqueous solution and (D) a 0.002 mmol/ml aqueous solution of the neutralized acid form (meth)acrylic acid-base polymer, respectively.

(3) Then, 10 ml each of the aqueous solutions (A) to (D) obtained as described above under (2) was placed in each of four Cannon Fenske kinematic viscometers (product of Kusano Kagaku Kikai Seisakusho K. K., #100), respectively. The kinematic viscometers were immersed in a constant-temperature water bath adjusted in advance to a water temperature of 30° C. for 30 minutes. The time t (seconds) required for the aqueous solution to flow down between two prescribed graduations was determined. Further, the same procedure was performed using a 2 N aqueous sodium hydroxide solution (E) as a blank in lieu of the aqueous solutions (A) to (D), and the time $t_0$ (seconds) required for the aqueous solution (E) to flow down was determined.

(4) Then, for each of the four kinematic viscometers, the relative viscosity $\eta_{rel}$ (=$t/t_0$), specific viscosity $\eta_{sp}$ (=$\eta_{rel}$−1), and reduced viscosity $\eta_{sp}/C$ were calculated. Here, "C" is the concentration (mmol/ml) of the aqueous (meth) acrylic acid based polymer solution. A graph was constructed by plotting the above four calculated values with the concentration C (mmol/ml) of the aqueous (meth) acrylic acid based polymer solution (on the abscissa) against the reduced viscosity $\eta_{sp}/C$ (ml/mmol) (on the ordinate). The point of intersection of the straight line connecting those calculated values and the ordinate was taken as the intrinsic viscosity (ml/mmol).

(Insoluble Matter Content Determination Method)

Deionized water (500 g) was placed in a 500-ml beaker, and 1.0 g of the sufficiently dried (meth)acrylic acid based polymer was added to the deionized water with stirring using a magnetic stirrer. Then, the mixture was stirred (100 rpm) at 25° C. for 2 hours using a jar tester and then filtered through a 32-mesh filter to thereby separate an insoluble matter in hydrous state. This insoluble matter was weighed immediately (within 1 minute) in order to not dry the same, and the insoluble matter content was calculated according to the following calculation formula:

Insoluble matter(% by mass)={mass of insoluble matter (g)/500 (g)}×100

The above-mentioned filtration and weighing were carried out at 25° C. and a humidity of 60%.

EXAMPLE 2

A reaction mixture was prepared in the same manner as in Example 1 except that 199.0 g of acrylic acid, 55.4 g of deionized water, 41.5 g of the 48% aqueous solution of sodium hydroxide, 1.38 g of the 2% aqueous solution of V-50 and 2.76 g of the 2% aqueous solution of sodium hypophosphite were used.

The neutralization degree of the monomer in this reaction mixture was 18 mole percent. The monomer concentration was 70% by mass. The V-50 addition amount was 0.01 g per mole of the monomer. The sodium hypophosphite addition amount was 0.02 g per mole of the monomer. This reaction mixture was subjected to polymerization in the same manner as in Example 1 to give a polymer (2) comprising a partially neutralized salt of polyacrylic acid. The intrinsic viscosity and insoluble matter content of polymer (2) were determined in the same manner as in Example 1. The results are shown in Table 1.

EXAMPLE 3

A reaction mixture was prepared in the same manner as in Example 1 except that the use of the 48% aqueous solution of sodium hydroxide was omitted, and 285 g of acrylic acid, 12.63 g of deionized water, 0.79 g of the 5% aqueous solution of V-50 in lieu of 2% aqueous solution of V-50 and 1.58 g of the 5% aqueous solution of sodium hypophosphite in lieu of 2% aqueous solution of sodium hypophosphite were used.

The neutralization degree of the monomer in this reaction mixture was 0 mole percent. The monomer concentration was 95% by mass. The V-50 addition amount was 0.01 g per mole of the monomer. The sodium hypophosphite addition amount was 0.02 g per mole of the monomer. This reaction mixture was subjected to polymerization in the same manner as in Example 1 to give a polymer (3) comprising polyacrylic acid. The intrinsic viscosity and insoluble matter content of polymer (3) were determined in the same manner as in Example 1. The results are shown in Table 1.

EXAMPLE 4

A reaction mixture was prepared in the same manner as in Example 1 except that 38.09 g of acrylic acid and 109.5 g of 2-acrylamide-2-methylpropanesulfonic acid in lieu of acrylic acid in Example 1 were used, and 142.0 g of deionized water, 8.83 g of the 48% aqueous solution of sodium hydroxide, 0.53 g of the 2% aqueous solution of V-50 and 1.06 g of the 2% aqueous solution of sodium hypophosphite were used.

The neutralization degree of the monomer in this reaction mixture was 10 mole percent. The monomer concentration was 50% by mass. The V-50 addition amount was 0.01 g per mole of the monomer. The sodium hypophosphite addition amount was 0.02 g per mole of the monomer. This reaction mixture was subjected to polymerization in the same manner as in Example 1 to give a polymer (4) comprising a partially neutralized acrylic acid/2-acrylamide-2-methylpropanesulfonic acid (mole ratio: 50/50). The intrinsic viscosity and insoluble matter content of polymer (4) were determined in the same manner as in Example 1. The results are shown in Table 1.

EXAMPLE 5

A reaction mixture was prepared in the same manner as in Example 1 except that 188.1 g of acrylic acid and 17.62 g of sodium 3-allyloxy-2-hydroxypropanesulfonate (HAPS) in lieu of acrylic acid in Example 1 were used, and 74.58 g of deionized water, 15.66 g of the 48% aqueous solution of sodium hydroxide, 1.35 g of the 2% aqueous solution of V-50 and 2.69 g of the 2% aqueous solution of sodium hypophosphite were used.

The neutralization degree of the monomer in this reaction mixture was 10 mole percent. The monomer concentration was 70% by mass. The V-50 addition amount was 0.01 g per-mole of the monomer. The sodium hypophosphite addition amount was 0.02 g per mole of the monomer. This reaction mixture was subjected to polymerization in the same manner as in Example 1 to give a polymer (5) comprising a partially neutralized acrylic acid/3-allyloxy-2-hydroxypropanesulfonic acid (mole ratio: 97/3). The intrinsic viscosity and insoluble matter content of polymer (5) were determined in the same manner as in Example 1. The results are shown in Table 1.

EXAMPLE 6

A reaction mixture was prepared in the same manner as in Example 1 except that 157.1 g of acrylic acid and 46.96 g of methacrylic acid (MAA) in lieu of acrylic acid in Example 1 were used, and 69.15 g of deionized water, 22.7 g of the 48% aqueous solution of sodium hydroxide, 1.36 g of the 2% aqueous solution of V-50 and 2.73 g of the 2% aqueous solution of sodium hypophosphite were used.

The neutralization degree of the monomer in this reaction mixture was 10 mole percent. The monomer concentration was 70% by mass. The V-50 addition amount was 0.01 g per mole of the monomer. The sodium hypophosphite addition amount was 0.02 g per mole of the monomer. This reaction mixture was subjected to polymerization in the same manner as in Example 1 to give a polymer (6) comprising a partially neutralized acrylic acid/methacrylic acid (mole ratio: 80/20). The intrinsic viscosity and insoluble matter content of polymer (6) were determined in the same manner as in Example 1. The results are shown in Table 1.

EXAMPLE 7

A reaction mixture was prepared in the same manner as in Example 1 except that 1.42 g of 2% solution of photopolymerization initiator Darocure (DC) 1173 (product of Ciba Specialty Chemicals, chemical name; 2-hydroxy-2-methyl-1-phenyl-propane-1-one) in acrylic acid in lieu of the 2% aqueous solution of V-50 in Example 1 was used, and 202.4 g of acrylic acid and 69.75 g of deionized water were used.

The neutralization degree of the monomer in this reaction mixture was 10 mole percent. The monomer concentration was 70% by mass. The addition amount of Darocure 1173 was 0.01 g per mole of the monomer. The sodium hypophosphite addition amount was 0.02 g per mole of the monomer. This reaction mixture was subjected to polymerization in the same manner as in Example 1 to give a polymer (7) comprising a partially neutralized polyacrylic acid. The intrinsic viscosity and insoluble matter content of polymer (7) were determined in the same manner as in Example 1. The results are shown in Table 1.

EXAMPLE 8

A reaction mixture was prepared and polymerized in the same manner as in Example 1 except that near-ultraviolet rays at an intensity of 7 W/m$^2$ was irradiated from the beginning for 15 minutes, the intensity was increased to 20 W/m$^2$ thereafter and irradiated for further 15 minutes, to give a polymer (8) comprising a partially neutralized polyacrylic acid. The intrinsic viscosity and insoluble matter content of polymer (8) were determined in the same manner as in Example 1. The results are shown in Table 1.

EXAMPLE 9

A reaction mixture was prepared in the same manner as in Example 1 except that the use of the 48% aqueous solution of sodium hydroxide was omitted, and 291 g of acrylic acid, 6.57 g of deionized water, 0.81 g of the 5% aqueous solution of V-50 in lieu of 2% aqueous solution of V-50 and 1.62 g of the 5% aqueous solution of sodium hypophosphite in lieu of 2% aqueous solution of sodium hypophosphite were used.

The neutralization degree of the monomer in this reaction mixture was 0 mole percent. The monomer concentration was 97% by mass. The V-50 addition amount was 0.01 g per mole of the monomer. The sodium hypophosphite addition amount was 0.02 g per mole of the monomer. This reaction mixture was subjected to polymerization in the same manner as in Example 1 to give a polymer (9) comprising polyacrylic acid. The intrinsic viscosity and insoluble matter content of polymer (9) were determined in the same manner as in Example 1. The results are shown in Table 1.

EXAMPLE 10

A reaction mixture was prepared in the same manner as in Example 1 except that the use of the 48% aqueous solution of sodium hydroxide was omitted, and 120 g of acrylic acid, 177.5 g of deionized water, 0.83 g of the 2% aqueous solution of V-50 and 1.66 g of the 2% aqueous solution of sodium hypophosphite were used.

The neutralization degree of the monomer in this reaction mixture was 0 mole percent. The monomer concentration was 40% by mass. The V-50 addition amount was 0.01 g per mole of the monomer. The sodium hypophosphite addition amount was 0.02 g per mole of the monomer. This reaction mixture was subjected to polymerization in the same manner as in Example 1 to give a polymer (10) comprising polyacrylic acid. The intrinsic viscosity and insoluble matter content of polymer (10) were determined in the same manner as in Example 1. The results are shown in Table 1.

The following Comparative Examples 1, 2 and 3 are comparative examples relating to polymers whose neutralization degree was less than 20 mole percent.

COMPARATIVE EXAMPLE 1

A reaction mixture was prepared in the same manner as in Example 1 except that the 2% aqueous solution of sodium hypophosphite as chain transfer agent was not used and that deionized water was used in an amount of 71.18 g.

This reaction mixture had a monomer neutralization degree of 10 mole percent and a monomer concentration of 70% by mass. The addition amount of V-50 was 0.01 g per mole of the monomer. This reaction mixture was subjected to polymerization in the same manner as in Example 1 to give a comparative polymer (1) comprising partially neutralized salt of polyacrylic acid. The intrinsic viscosity and insoluble matter content of the comparative polymer (1) were determined in the same manner as in Example 1. The results are shown in Table 1. As shown in this Comparative Example 1, the intrinsic viscosity was only about 27 ml/millimoles when no chain transfer agent was used in spite of the monomer concentration selected at a high level at the time of polymerization; the polymer failed to have the improved physical properties as desired. The insoluble matter was so high, namely 12.2%, as compared with the range of 0.3 to 3.8% found in Examples 1 to 10.

COMPARATIVE EXAMPLE 2

A 2-liter four-necked flask equipped with a nitrogen gas inlet, stirrer and so on was charged with 203.8 parts of acrylic acid and 71.18 parts of deionized water, and 23.6 parts of a 48% aqueous solution of sodium hydroxide was added with cooling. Thus, the neutralization degree of the monomer was 10 mole percent. Then, the aqueous solution in the flask was bubbled with nitrogen gas with stirring for 30 minutes to thereby remove the dissolved oxygen.

Thereafter, 1.42 parts of a 2% aqueous solution of 2,2'-azobis(2-amidinopropane) dihydrochloride as thermal polymerization initiator and 2.83 parts of a 2% aqueous solution of sodium hypophosphite monohydrate were added. Thus, the addition amount of 2,2'-azobis(2-amidinopropane) dihydrochloride was 0.01 g and the addition amount of sodium hypophosphite monohydrate was 0.02 g per mole of the monomer component. The monomer component concentration in the reaction mixture was 70%.

The mode of polymerization in Comparative Example 2 is the conventional thermal polymerization. In thermal polymerization, a water-soluble polymer having an intrinsic viscosity of about 24 ml/millimoles can be produced, but the insoluble matter content becomes as high as 9.9%. Therefore, it is anticipated that when a water-soluble polymer with a neutralization degree of less than 20 mole percent is produced by the conventional thermal polymerization technique, it will be difficult to attain an intrinsic viscosity of not lower than 30 ml/mmol, specifically within the specific range of 30 to 120 ml/mmol, while suppressing the insoluble matter content at a low level.

Figure 7:
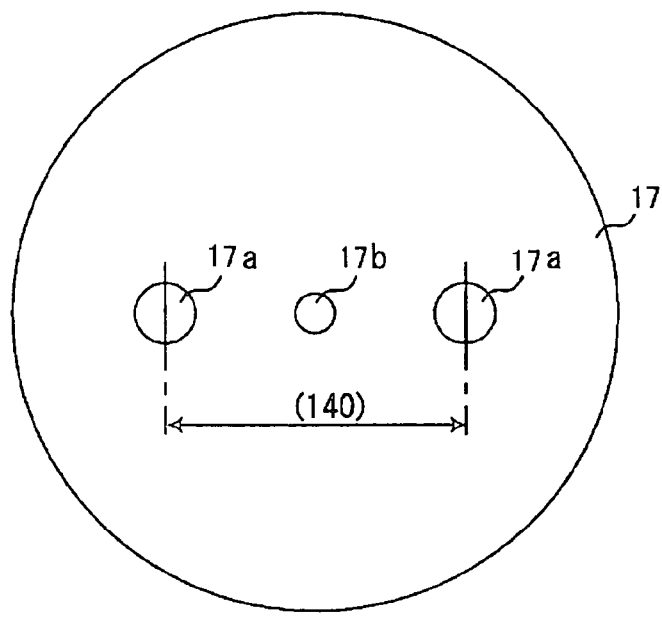
FIG. 7 is a schematic representation of the polymerization vessel 14 used in Comparative Examples; (a) is a plan view of the polymerization vessel 14, and (b) is a sectional view of the polymerization vessel 14. The numerical values in the parentheses indicate respective sizes of the polymerization vessel.
Figure 7:
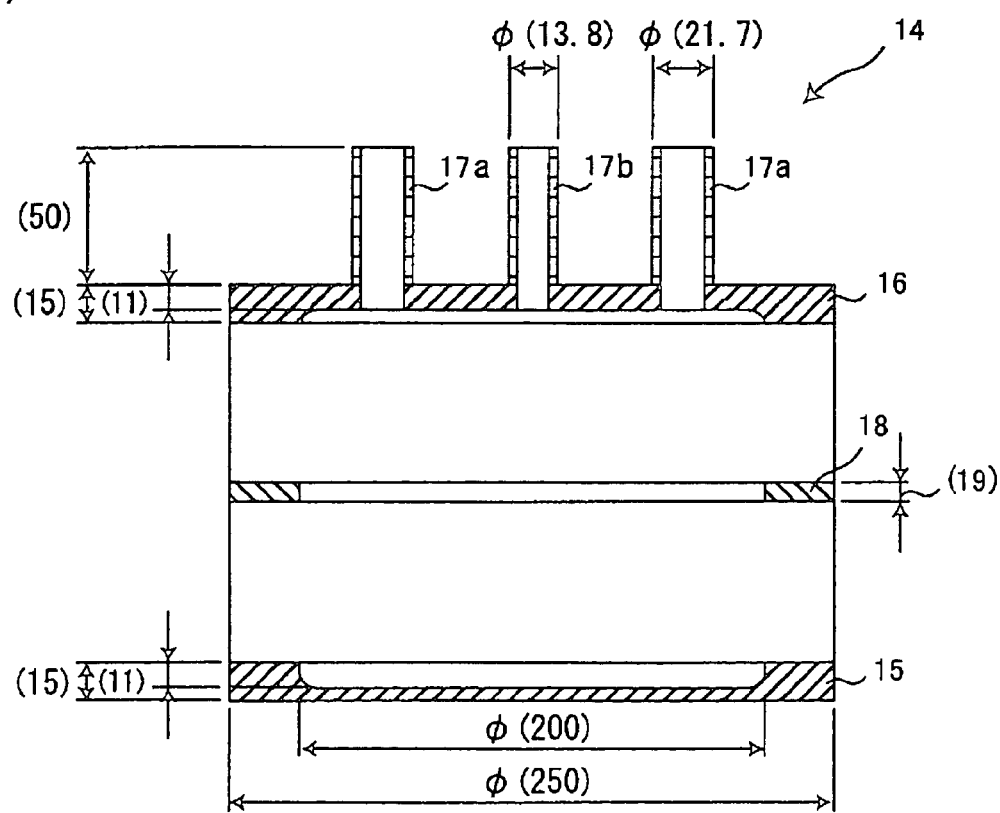

FIG. 7 is a schematic representation of the polymerization vessel 14 used in Comparative Example 2. (a) is a plan view of the polymerization vessel 14, and (b) is a sectional view of the polymerization vessel 14. This polymerization vessel 14 comprises a lower vessel part 15 and an upper vessel part (cover part) 16, each made of stainless steel (SUS 304), a packing 18 and so on. The cover part 16 has inlets 17a for charging the reaction mixture and a thermometer insertion port 17b for insertion of a measuring resistor (platinum wire).

The reaction mixture mentioned above was placed in the above-mentioned lightproof polymerization vessel 14, and the polymerization vessel 14 was immersed in a constant-temperature water bath adjusted in advance to a water temperature of 28° C. The temperature of the reaction mixture rose immediately and the thermal polymerization started. After 68 minutes, the temperature arrived at 64.5° C. (primary peak temperature). Then, the temperature of the constant-temperature water bath was raised to 75° C. and, after arrival at that temperature, the polymerization was allowed to proceed for 60 minutes for completion of the polymerization. After completion, the reaction product in the polymerization vessel 14 was cooled by lowering the temperature of the constant-temperature water bath to ordinary temperature, and the polymerization vessel 14 was disintegrated and the reaction product was taken out. In this manner, a gel-like, partially neutralized polyacrylic acid was obtained. This gel-like, partially neutralized polyacrylic acid was treated in the same manner as in Example 1 to give a comparative polymer (2). The intrinsic viscosity and insoluble matter content of the comparative polymer (2) were measured in the same manner as in Example 1. The results are shown in Table 1.

COMPARATIVE EXAMPLE 3

A reaction mixture was prepared in the same manner as in Example 1 except that 87.3 g of acrylic acid in lieu of acrylic acid in Example 1, 202 g of deionized water, 10.1 g of a 48% aqueous solution of sodium hydroxide, 0.60 g of a 2% aqueous solution of V-50 and 0 g of a 2% aqueous solution of sodium hypophosphite were used. This reaction mixture had a monomer neutralization degree of 10 mole percent and a monomer concentration of 30% by mass. The V-50 addition amount was 0.01 g per mole of the monomer, and the sodium hypophosphite addition amount was 0 g per mole of the monomer. This reaction mixture was subjected to polymerization in the same manner as in Example 1 to give a gel-like polymer. An attempt was made to cut the gel-like polymer with scissors, but the gel stuck to the scissors and the cutting was not easy. The gel was treated in the same manner as in Example 1 to give a comparative polymer (3).

Thus, it was presumed that, as compared with the water-soluble polymers produced in the Examples mentioned above, the water-soluble polymer produced under the conditions of Comparative Example 3 be a polymer easily sticking to the inside wall of the polymerization vessel or polymerization apparatus, the stirring apparatus of the polymerization apparatus or the belt portion of the belt polymerization apparatus, or the thermoplastic film used in the belt polymerization apparatus, or the disintegrator equipped where necessary, hence inferior in handling property.

The intrinsic viscosity and insoluble matter content of the comparative polymer (3) were determined in the same manner as in Example 1. The results are shown in Table 1. The residual monomer content in the comparative polymer (3) was determined in the same manner as in Example 1 and found to be 3.4 mole percent.

Therefore, it was revealed that the water-soluble polymer produced under the conditions of Comparative Example 3 had a higher residual monomer content as compared with the water-soluble polymers produced under the conditions of the Examples mentioned above.

TABLE 1

| | Monomer composition (mole ratio) | Monomer concentration (% by mass) | Neutralized group content (mole %) | Photo-polymerization initiator (g/mol) | Chain transfer agent (g/mol) | Photoirradiation intensity at time of initiation of polymerization (W/m$^2$) | Intrinsic viscosity (ml/millimole) | Insoluble matter (% by mass) |
|---|---|---|---|---|---|---|---|---|
| Examples | | | | | | | | |
| 1 | AA | 70 | 10 | V-50, 0.01 | 0.02 | 3 | 116 | 0.3 |
| 2 | AA | 70 | 18 | V-50, 0.01 | 0.02 | 3 | 84 | 1.2 |
| 3 | AA | 95 | 0 | V-50, 0.01 | 0.02 | 3 | 74 | 1.7 |
| 4 | AA/AMPS = 50/50 | 50 | 10 | V-50, 0.01 | 0.02 | 3 | 106 | 1.5 |
| 5 | AA/HAPS = 97/3 | 70 | 10 | V-50, 0.01 | 0.02 | 3 | 103 | 0.2 |
| 6 | AA/MAA = 80/20 | 70 | 10 | V-50, 0.01 | 0.02 | 3 | 94 | 0.9 |
| 7 | AA | 70 | 10 | DC, 0.01 | 0.02 | 3 | 104 | 0.7 |
| 8 | AA | 70 | 10 | V-50, 0.01 | 0.02 | 7 | 91 | 1.2 |
| 9 | AA | 97 | 0 | V-50, 0.01 | 0.02 | 3 | 42 | 3.5 |
| 10 | AA | 40 | 0 | V-50, 0.01 | 0.02 | 3 | 36 | 3.8 |
| Compar. Ex. | | | | | | | | |
| 1 | AA | 70 | 10 | V-50, 0.01 | 0 | 3 | 27 | 12.2 |
| 2 | AA | 70 | 10 | V-50, 0.01 | 0.02 | (Thermal polymerization) | 24 | 9.9 |
| 3 | AA | 30 | 10 | V-50, 0.01 | 0 | 3 | 26 | 4.5 |

In the following, remarks are made about Table 1.

Referring to the monomer compositions (monomer components), "AA" stands for acrylic acid, "AMPS" for 2-acrylamide-2-methylpropanesulfonic acid, "HAPS" for sodium 3-allyloxy-2-hydroxypropanesulfonate, and "MAA" for methacrylic acid.

Referring to the photopolymerization initiators, "V-50" stands for 2,2'-azobis-2-amidinopropane dihydrochloride, and "DC" for Darocure 1173 (2-hydroxy-2-methyl-1-phenyl-propane-1-one).

When Examples 3, 9 and 10 in Table 1 are compared with one another, it is found that there is an optimum range in the relation between the monomer concentration and the intrinsic viscosity of the water-soluble polymer obtainable in the mode of practice of the photopolymerization according to the invention.

It is seen that the increase in monomer concentration from 40% to 95% resulted in the increase in intrinsic viscosity from 36 to 74. Thus, when the monomer concentration is increased, the intrinsic viscosity can be increased in case of an acid form water-soluble polymer. There is an optimum range in the monomer concentration as well; when the monomer concentration is increased to 97%, the intrinsic viscosity tends to decrease slightly.

In Example 8 (monomer concentration: 70%), the intrinsic viscosity was as high as 91. In Comparative Example 3 to be mentioned later, in which the same monomer component as in Example 8 was used and the use of a chain transfer agent, which is one of the constituents of the invention, was omitted and in which a water-soluble polymer having the same composition as in Example 8 was produced by photopolymerization at the same photoirradiation intensity but at a low monomer concentration of 30%, the intrinsic viscosity in Comparative Example 3 amounted only to 26. Therefore, it becomes known that when the use of a chain transfer agent is combined with an increased monomer concentration in the photopolymerization method of the invention, the intrinsic viscosity, which is one of the physical properties of the water-soluble polymer, is increased.

Referring to Table 1, the insoluble matter contents in Examples 9 and 10 were somewhat high. Thus, as for more preferred conditions for producing the water-soluble polymer of the invention, the mode of carrying out the photopolymerization at a monomer concentration at the time of polymerization within the range of 50 to 95%, in which the insoluble matter content of the polymers amounts to not more than 3%, is more preferred.

Example 11

A cataplasm base was prepared according to the formulation shown in Table 2.

TABLE 2

| Name of ingredient | % by mass |
|---|---|
| Polymer (1) obtained in Example 1 | 4 |
| Glycerol | 20 |
| Kaolin | 10 |
| Gelatin | 5 |
| Polyoxyethylene (20) sorbitan monooleate (product of Wako Pure Chemical) | 2 |
| Aluminum chloride | 1 |
| Methyl salicylate | 0.5 |
| 1-Mentol | 0.5 |
| Camphor | 0.5 |
| Peppermint oil | 0.5 |
| Wat r | 56 |
| Total | 100 |

The cataplasm base obtained was applied onto a non-woven fabric to a thickness of 3 mm, and the adhesiveness was evaluated by touching with a finger. Further, this cataplasm base was placed in a 100-ml beaker to a thickness of 30 mm, and the shape retentivity (restorability) was evaluated by touching with a finger. The results obtained are shown in Table 3.

In shape retentivity evaluation, whether the fingertip-shaped indentation made on the base by finger touching was completely restored to the original shape, or the rapidity of restoration to the original shape was taken as a criterion. "High shape retentivity" means that when an indentation is made by means of a finger, the base rapidly returns to its original shape upon separation of the finger. The cataplasm base for physical properties measurement was prepared in a constant-temperature room maintained at 25° C. and a humidity of 60%, and the adhesiveness and shape retentivity were evaluated under the same conditions. In the following Examples and Comparative Examples, too, the cataplasm bases for physical properties measurement were produced in a constant-temperature room maintained at 25° C. and a humidity of 60% and evaluated for adhesiveness and shape retentivity under the same conditions.

EXAMPLES 12 to 20

Evaluations were performed in the same manner as in Example 11 except that the polymers (2) to (10) obtained in Examples 2 to 10 were used in lieu of the polymer (1) used in Example 11. The results obtained are shown in Table 3.

COMPARATIVE EXAMPLES 4, 5 and 7

Cataplasm bases were prepared and evaluated for adhesiveness and shape retentivity in the same manner as in Example 11 except that the comparative polymer (1), comparative polymer (2) or comparative polymer (3) obtained in Comparative Example 1, Comparative Example 2 or Comparative Example 3 was used in lieu of the polymer (1) used in Example 11. The results thus obtained are shown in Table 3.

It was revealed that the water-soluble polymer produced under the conditions of Comparative Example 3 was poor in adhesiveness and shape retentivity, which are physical properties required of cataplasms, as compared with the water-soluble polymers produced under the conditions of the above-mentioned Examples. On the contrary, the cataplasms in which the water-soluble polymers produced under the production conditions according to the constitution of the present invention were used were satisfactory in adhesiveness and shape retentivity.

COMPARATIVE EXAMPLE 6

A cataplasm base was prepared and evaluated for adhesiveness and shape retentivity in the same manner as in Example 11 except that 5% by mass of a mixture composed of 75 parts of sodium polyacrylate with a weight average molecular weight of 3,000,000 and 25 parts of polyacrylic acid with a weight average molecular weight of 50,000 was used in lieu of the polymer (1) used in Example 11. The results are shown in Table 3. The sodium polyacrylate with a weight average molecular weight of 3,000,000 as used in Comparative Example 6 had an insoluble matter content of 1.2%. The polyacrylic acid with a weight average molecular weight of 50,000 as used in Comparative Example 6 had an insoluble matter content of 0%.

TABLE 3

| | Polymer used | Adhesiveness | Shape retentivity |
|---|---|---|---|
| Example 11 | Polymer (1) obtained in Example 1 | 5 | 5 |
| Example 12 | Polymer (2) obtained in Example 2 | 4 | 3 |
| Example 13 | Polymer (3) obtained in Example 3 | 3 | 4 |
| Example 14 | Polymer (4) obtained in Example 4 | 4 | 4 |
| Example 15 | Polymer (5) obtained in Example 5 | 4 | 5 |
| Example 16 | Polymer (6) obtained in Example 6 | 5 | 4 |
| Example 17 | Polymer (7) obtained in Example 7 | 4 | 5 |
| Example 18 | Polymer (8) obtained in Example 8 | 4 | 5 |
| Example 19 | Polymer (9) obtained in Example 9 | 3 | 3 |
| Example 20 | Polymer (10) obtained in Example 10 | 3 | 3 |
| Compar. Ex. 4 | Comparative polymer (1) obtained in Compar. Ex. 1 | 2 | 1 |
| Compar. Ex. 5 | Comparative polymer (2) obtained in Compar. Ex. 2 | 2 | 2 |
| Compar. Ex. 6 | Combined use of sodium polyacrylate with Mw3000000 and polyacrylic acid with Mw50000 | 1 | 1 |
| Compar. Ex. 7 | Comparative polymer (3) obtained in Compar. Ex. 3 | 2 | 1 |

Adhesiveness evaluation criteria
Adhesiveness: 5 (strong) → 1 (weak)
Shape retentivity evaluation criteria
Shape retentivity: 5 (good) → 1 (poor)

EXAMPLE 21

A planetary type mixer (soil mixer) equipped with beater type agitating blades was charged with a prescribed amount of a hydrous soil, which was a surplus soil with a water content of 45% as generated from an ordinary engineering work in a Kanto district. Then, while this hydrous soil was agitated at 160 rpm, 0.07 part by weight, per 100 parts by weight of the hydrous soil, of the polymer (1) obtained in Example 1 was added, and the mixture was agitated for 60 seconds from the time of addition to give grains with an average grain diameter of 4 mm.

In this Example 21, the water-soluble polymer was evaluated for its ability to modify dug soil. When a dug soil treating agent gave a granulated soil with an average grain diameter as small as possible after surplus soil treatment, the agent was evaluated as being good in performance.

EXAMPLES 22 to 30

The evaluation was carried out in the same manner as in Example 21 except that polymers (2) to (10) obtained in Examples 2 to 10 were used in lieu of the polymer (1) used in Example 21. The results are shown in Table 4.

COMPARATIVE EXAMPLES 8, 9 and 10

The evaluation was carried out in the same manner as in Example 21 except that the comparative polymer (1), comparative polymer (2) or comparative polymer (3) obtained in Comparative Example 1, Comparative Example 2 or Comparative Example 3 was used in lieu of the polymer (1) used in Example 21. The results are shown in Table 4.

As for the performances as dug soil treating agents, the water-soluble polymers of Examples 1 to 10, when used as dug soil treating agents, gave average surplus soil grain diameters of 2 to 13 mm. On the contrary, when the same surplus soil was treated with dug soil treating agents comprising the water-soluble polymers of the Comparative Examples, only granulated surplus soils with a relatively large average grain diameter, namely an average grain diameter of 22 to 29 mm, could be obtained. That granulated surplus soils after treatment can have a reduced average grain diameter and thus become easy to treat is to be construed as one of the preferred effects of the dug soil treating agents in which the water-soluble polymers of the invention are used. The water-soluble polymer produced under the conditions of Comparative Example 3 was found to be poor in soil treatment performance, more specifically ability to reduce the surplus soil grain diameter, which is required of dug soil treating agents, as compared with the water-soluble polymers produced under the conditions of the above-mentioned examples according to the invention.

COMPARATIVE EXAMPLE 11

The evaluation was carried out in the same manner as in Example 21 except that polyacrylic acid with a weight average molecular weight of 800,000 and an insoluble matter content of 0.6% by mass was used in lieu of the polymer (1) used in Example 21. The results are shown in Table 4.

COMPARATIVE EXAMPLE 12

The evaluation was carried out in the same manner as in Example 21 except that polyacrylic acid with a weight average molecular weight of 1,400,000 and an insoluble matter content of 7.3% by mass was used in lieu of the polymer (1) used in Example 21. The results are shown in Table 4.

TABLE 4

| | Polymer used | Average grain diameter (mm) |
|---|---|---|
| Example 21 | Polymer (1) obtained in Example 1 | 4 |
| Example 22 | Polymer (2) obtained in Example 2 | 5 |
| Example 23 | Polymer (3) obtained in Example 3 | 5 |
| Example 24 | Polymer (4) obtained in Example 4 | 2 |
| Example 25 | Polymer (5) obtained in Example 5 | 3 |
| Example 26 | Polymer (6) obtained in Example 6 | 3 |
| Example 27 | Polymer (7) obtained in Example 7 | 6 |
| Example 28 | Polymer (8) obtained in Example 8 | 9 |
| Example 29 | Polymer (9) obtained in Example 9 | 13 |
| Example 30 | Polymer (10) obtained in Example 10 | 11 |
| Compar. Ex. 8 | Comparative polymer (1) obtained in Compar. Ex. 1 | 22 |
| Compar. Ex. 9 | Comparative polymer (2) obtained in Compar. Ex. 2 | 29 |
| Compar. Ex. 10 | Comparative polymer (3) obtained in Compar. Ex. 3 | 26 |
| Compar. Ex. 11 | Polyacrylic acid with Mw800000 | 25 |
| Compar. Ex. 12 | Polyacrylic acid with Mw1400000 | 27 |

Example 31
A 2-liter four-necked flash equipped with a nitrogen inlet tube, a stirrer and so forth was charged with 135 g of acrylic acid and 159.7 g of deionized water. Therefore, the neutralization degree of the monomer was 0 mole percent.

Then, while stirring the aqueous solution of acrylic acid in the flask, nitrogen gas was bubbled into the solution to remove the dissolved oxygen. Thereafter, 1.88 g of a 0.2% aqueous solution of 2,2'-azobis(2-amidinopropane) dihydrochloride (product of Wako Pure Chemical Industries, trademark: V-50) as a thermal polymerization initiator, 1.5 g of a 1% aqueous solution of 2,2'-azobis[2-(imidazolin-2-yl)propane] dihydrochloride (product of Wako Pure Chemical Industries, trademark: VA-044) as a thermal polymerization initiator, and 1.88 g of a 1% aqueous solution of sodium hypophosphite were added to the above aqueous solution. Therefore, the used amount of 2,2'-azobis(2-amidinopropane) dihydrochloride was 0.002.g, the used amount of 2,2'-azobis[2-(imidazolin-2-yl)propane] dihydrochloride was 0.008 g, and the used amount of sodium hypophosphite was 0.01 g, per mole of the monomer component. The monomer component concentration in the reaction mixture was 45%. The above reaction mixture was placed in the light-shielding polymerization vessel 10 used in Comparative Example 2, and the polymerization vessel was immersed in a constant-temperature water bath adjusted in advance to a water temperature of 21° C. The temperature of the reaction mixture rose immediately and thermal polymerization was initiated. After 33 minutes, the temperature arrived at 36.4° C. (primary peak temperature). Thereafter, the temperature of the constant-temperature water bath was raised to 45° C. and this temperature was maintained for 45 minutes, whereby the reaction temperature arrived at 52° C. (secondary peak temperature). Thereafter, the temperature of the constant-temperature water bath was raised to 75° C., and the polymerization was allowed to proceed for 60 minutes after arriving at that temperature and thereby the polymerization was completed. After completion, the temperature of the constant-temperature water bath was lowered to ordinary temperature to cool the reaction product in the polymerization vessel. The polymerization vessel was then disintegrated and the reaction product was taken out. The gel-like polyacrylic acid was thus obtained. This gel-like polymer was treated in the same manner as in Example 1 to give a polymer (11). The intrinsic viscosity and insoluble matter content of the polymer (11) were determined in the same manner as in Example 1. The results are shown in Table 5.

In Table 5, V-50 (trademark, product of Wako Pure Chemical Industries) stands for 2,2'-azobis(2-amidinopropane) dihydrochloride, and VA-044 (trademark, product of Wako Pure Chemical Industries) for 2,2'-azobis[2-(imidazolin-2-yl)propane] dihydrochloride.

TABLE 5

| | Monomer composition (mole ratio) | Monomer concentration (% by mass) | Neutralized group content (mole %) | Thermal polymerization initiator (g/mol) | Chain transfer agent (g/mol) | Intrinsic viscosity (ml/millimole) | Insoluble matter (% by mass) |
|---|---|---|---|---|---|---|---|
| Example 31 | AA | 45 | 0 | V-50, 0.002 VA-044, 0.008 | 0.01 | 33 | 3.9 |

[B] Examples of Water-Soluble Polymers having a Neutralized Group Content of 20 to 80 Mole Percent

Example 32

A 500-ml stainless steel vessel was charged with 222.9 g of acrylic acid and 3.32 g of deionized water and, 64.5 g of a 48% aqueous solution of sodium hydroxide was added with cooling to give an aqueous solution of partially neutralized salt of acrylic acid. The dissolved oxygen was removed by bubbling this aqueous solution of partially neutralized salt of acrylic acid with nitrogen gas. This aqueous solution was then adjusted to a temperature of 10° C., and 4.64 g of a 2% aqueous solution of the photopolymerization initiator V-50 (product of Wako Pure Chemical Industries, azo photopolymerization initiator, chemical name: 2,2'-azobis-2-amidinopropane dihydrochloride) and 4.64 g of a 2% aqueous solution of the chain transfer agent sodium hypophosphite were added to and uniformly mixed with the monomer solution.

This reaction mixture contained acrylic acid and sodium acrylate as monomers, and the proportion of the salt form monomer (sodium acrylate) relative to the whole monomer, namely neutralization degree, was 25 mole percent. The monomer (acrylic acid plus sodium acrylate) concentration in the reaction mixture was 80% by mass. The addition amount of V-50 was 0.03 g per mole of the monomer. The addition amount of sodium hypophosphite was 0.03 g per mole of the monomer.

The same polymerization as in Example 1 was carried out to give a gel-like polymer. The residual monomer content of the thus-obtained gel-like polymer was determined in the same manner as in Example 1 and found to be 0.2 mole percent. The gel-like polymer was subjected to the same procedure as in Example 1 to give a polymer (12) comprising partially neutralized polyacrylic acid. The gel-like polymer could be cut easily with scissors without sticking to the scissors. The weight average inertial radius and insoluble matter content of the polymer (12) were determined by the following methods. The results are shown in Table 6.

(Weight Average Inertial Radius Measurement Method)
(1) A 0.5% aqueous solution of the (meth)acrylic acid based polymer was adjusted to pH 10 (25° C.) by adding a 5% by mass of aqueous solution of sodium hydroxide to give a solution of a completely neutralized polymer. Then, solutions containing 0.16 M/L NaCl and the neutralized polymer at the following concentrations were prepared by adding NaCl and deionized water. Thus prepared were solutions containing the neutralized (meth)acrylic acid based polymer at (A) 0.05 mg/ml, (B) 0.1 mg/ml, (C) 0.2 mg/ml, (D) 0.4 mg/ml, (E) 0.5 mg/ml, (F) 1 mg/ml, and (G) 2 mg/ml, respectively.
(2) The solutions (A) to (G) were respectively filtered through a 0.45-μm membrane filter to give measurement samples (A) to (G). The measurement samples (A) to (D) were then measured for light scattering intensity using a dynamic light scattering photometer (product of Otsuka Electronics Co., Ltd., DSL-700). The measurement samples (E) to (G) were measured for refractive index using a high-sensitivity differential refractometer (product of Otsuka Electronics Co., Ltd., RM-102). All the measurements were carried out at a constant temperature of 25° C.
(3) The weight average inertial radius was calculated from the light scattering intensities of the measurement samples (A) to (D) and the refractive indices of the measurement samples (E) to (G) by the Berry plot method using a calculation software (product of Otsuka Electronics Co., Ltd., DLS-700S).

As described above, the weight average inertial radius referred to herein is one measured by the Berry plot method from light scattering intensities determined by means of a dynamic light scattering photometer and refractive indices of neutralized polymer solutions at prescribed concentrations.

The rate of change (dn/dc) in refractive index against sample concentration, which is necessary in calculating the weight average inertial radius is calculated, using the above-mentioned high-sensitivity differential refractometer. The above-mentioned Berry plot method used in the practice of the invention is described by G. C. Berry et al. in The Journal of Chemical Physics, Vol. 44, No. 12 (1966), pp. 4550–4564.

In Japanese Kokai Publication Hei-8-67715 and Japanese Kokai Publication Hei-9-296388, it is described that the weight average inertial radius of an acrylamide polymer, which is similar to the (meth)acrylic acid based water-soluble polymer of the present invention, can be determined by the Debye plot method using a GPC apparatus available from Showa Denko K. K. and connecting a multiangular light scattering detection device to the detector of that apparatus. The weight average inertial radius is also referred to as the weight average inertial radius or a weight average root mean square radius and corresponds to $<S^2>^{1/2}$. In some instances, the Berry plot (very high molecular weight), Zimm plot (medium to high molecular weight) or Debye plot (low molecular weight) method may be used according to the molecular weight of the measurement target polymer. The Berry plot method is a method of plotting generally used when the molecular weight is very high, namely not less than 1,000,000 in terms of weight average molecular weight determined by GPC.

Further, U.S. Pat. No. 6,017,669 (corresponding to Japanese Patent Publication No. 3155930 and European Patent No. 764889) describes the inertial radius (S) of a binder resin in a toner composition. In this publication, use is made of the same dynamic light scattering photometer, product of Otsuka Electronics Co., Ltd., as the high-sensitivity differential refractometer used herein.

In addition to the above, a number of reference books or explanatory books dealing with the weight average inertial radius have been published. The user's manual attached to the Otsuka Electronics Co., Ltd. dynamic light scattering measurement apparatus also describes such a method of weight average inertial radius calculation as mentioned above.

The weight average inertial radius is also described in "Kobunshi Jiten (Dictionary of Polymers)", edited by the Society of Polymer Science, Japan, published 1985 by Asakura Shoten. 9th printing, pages 45 to 49.

Example 33

A reaction mixture was prepared in the same manner as in Example 32 except that 226.2 g of acrylic acid, 12.05 g of deionized water, 52.3 g of the 48% aqueous solution of sodium hydroxide, 4.71 g of the 2% aqueous solution of V-50 and 4.71 g of the 2% aqueous solution of sodium hypophosphite were used.

The neutralization degree of the monomer in this reaction mixture was 20 mole percent. The monomer concentration was 80% by mass. The V-50 addition amount was 0.03 g per mole of the monomer. The sodium hypophosphite addition amount was 0.03 g per mole of the monomer. This reaction mixture was subjected to polymerization in the same manner as in Example 32 to give a polymer (13) comprising a partially neutralized polyacrylic acid. The weight average inertial radius and insoluble matter content of polymer (13) were determined in the same manner as in Example 32. The results are shown in Table 6.

EXAMPLE 34

A reaction mixture was prepared in the same manner as in Example 32 except that 120.53 g of acrylic acid, 62.87 g of deionized water, 111.58 g of the 48% aqueous solution of sodium hydroxide, 2.51 g of the 2% aqueous solution of V-50 and 2.51 g of the 2% aqueous solution of sodium hypophosphite were used.

The neutralization degree of the monomer in this reaction mixture was 80 mole percent. The monomer concentration was 50% by mass. The V-50 addition amount was 0.03 g per mole of the monomer. The sodium hypophosphite addition amount was 0.03 g per mole of the monomer. This reaction mixture was subjected to polymerization in the same manner as in Example 32 to give a polymer (14) comprising a partially neutralized polyacrylic acid. The weight average inertial radius and insoluble matter content of polymer (14) were determined in the same manner as in Example 32. The results are shown in Table 6.

EXAMPLE 35

A reaction mixture was prepared in the same manner as in Example 32 except that 4.64 g of 2% solution of photopolymerization initiator Darocure (DC) 1173 (product of Ciba Specialty Chemicals, chemical name; 2-hydroxy-2-methyl-1-phenyl-propane-1-one) in acrylic acid in lieu of the 2% aqueous solution of V-50 in Example 32 was used, and 218.2 g of acrylic acid and 8.02 g of deionized water were used.

The neutralization degree of the monomer in this reaction mixture was 25 mole percent. The monomer concentration was 80% by mass. The addition amount of Darocure 1173 was 0.03 g per mole of the monomer. The sodium hypophosphite addition amount was 0.03 g per mole of the monomer. This reaction mixture was subjected to polymerization in the same manner as in Example 32 to give a polymer (15) comprising a partially neutralized polyacrylic acid. The weight average inertial radius and insoluble matter content of polymer (15) were determined in the same manner as in Example 32. The results are shown in Table 6.

EXAMPLE 36

A reaction mixture was prepared in the same manner as in Example 32 except that 44.69 g of acrylic acid and 128.3 g of 2-acrylamide-2-methylpropanesulfonic acid (AMPS) in lieu of 222.9 g of acrylic acid in Example 32 were used, and 97.42 g of deionized water, 25.83 g of the 48% aqueous solution of sodium hydroxide, 1.86 g of the 2% aqueous solution of V-50 and 1.86 g of the 2% aqueous solution of sodium hypophosphite were used.

The neutralization degree of the monomer in this reaction mixture was 25 mole percent. The monomer concentration was 60% by mass. The V-50 addition amount was 0.03 g per mole of the monomer. The sodium hypophosphite addition amount was 0.03 g per mole of the monomer. This reaction mixture was subjected to polymerization in the same manner as in Example 32 to give a polymer (16) comprising a partially neutralized acrylic acid/2-acrylamide-2-methylpropanesulfonic acid (mole ratio: 50/50). The weight average inertial radius and insoluble matter content of polymer (16) were determined in the same manner as in Example 32. The results are shown in Table 6.

EXAMPLE 37

A reaction mixture was prepared in the same manner as in Example 32 except that 206.3 g of acrylic acid and 19.32 g of sodium 3-allyloxy-2-hydroxypropanesulfonate (HAPS) in lieu of acrylic acid in Example 32 were used, and 11.32 g of deionized water, 54.2 g of the 48% aqueous solution of sodium hydroxide, 4.43 g of the 2% aqueous solution of V-50 and 4.43 g of the 2% aqueous solution of sodium hypophosphite were used.

The neutralization degree of the monomer in this reaction mixture was 25 mole percent. The monomer concentration was 80% by mass. The V-50 addition amount was 0.03 g per mole of the monomer. The sodium hypophosphite addition amount was 0.03 g per mole of the monomer. This reaction mixture was subjected to polymerization in the same manner as in Example 32 to give a polymer (17) comprising a partially neutralized acrylic acid/3-allyloxy-2-hydroxypropanesulfonic acid (mole ratio: 97/3). The weight average inertial radius and insoluble matter content of polymer (17) were determined in the same manner as in Example 32. The results are shown in Table 6.

EXAMPLE 38

A reaction mixture was prepared in the same manner as in Example 32 except that 172.1 g of acrylic acid and 51.41 g of methacrylic acid (MAA) in lieu of acrylic acid in Example 32 were used, and 5.28 g of deionized water, 62.25 g of the 48% aqueous solution of sodium hydroxide, 4.48 g of the 2% aqueous solution of V-50 and 4.48 g of the 2% aqueous solution of sodium hypophosphite were used.

The neutralization degree of the monomer in this reaction mixture was 25 mole percent. The monomer concentration was 80% by mass. The V-50 addition amount was 0.03 g per mole of the monomer. The sodium hypophosphite addition amount was 0.03 g per mole of the monomer. This reaction mixture was subjected to polymerization in the same manner as in Example 32 to give a polymer (18) comprising a partially neutralized acrylic acid/methacrylic acid (mole ratio: 80/20). The weight average inertial radius and insoluble matter content of polymer (18) were determined in the same manner as in Example 32. The results are shown in Table 6.

EXAMPLE 39

A reaction mixture was prepared and polymerized in the same manner as in Example 32 except that near-ultraviolet rays at an intensity of 7 W/m$^2$ was irradiated from the beginning for 15 minutes, the intensity was increased to 20 W/m$^2$ thereafter and irradiated for further 15 minutes, to give a polymer (19) comprising a partially neutralized polyacrylic acid. The weight average inertial radius and insoluble matter content of polymer (19) were determined in the same manner as in Example 32. The results are shown in Table 6.

EXAMPLE 40

A reaction mixture was prepared in the same manner as in Example 32 except that 106.9 g of acrylic acid, 139.2 g of deionized water, 49.5 g of the 48% aqueous solution of sodium hydroxide, 2.22 g of the 2% aqueous solution of V-50 and 2.22 g of the 2% aqueous solution of sodium hypophosphite were used.

The neutralization degree of the monomer in this reaction mixture was 40 mole percent. The monomer concentration was 40% by mass. The V-50 addition amount was 0.03 g per mole of the monomer. The sodium hypophosphite addition amount was 0.03 g per mole of the monomer. This reaction mixture was subjected to polymerization in the same manner as in Example 32 to give a polymer (20) comprising a partially neutralized polyacrylic acid. The weight average inertial radius and insoluble matter content of polymer (20) were determined in the same manner as in Example 32. The results are shown in Table 6.

EXAMPLE 41

A polymer (21) was prepared in the same manner as in Example 33 except that the monomer concentration was changed as indicated in Table 6, and the weight average inertial radius and insoluble matter content of polymer (21) were determined in the same manner as in Example 32. The results are shown in Table 6.

EXAMPLE 42

A reaction mixture was prepared in the same manner as in Example 32 except that 94.10 g of acrylic acid, 105.29 g of deionized water, 98.0 g of the 48% aqueous solution of sodium hydroxide, 1.96 g of the 2% aqueous solution of V-50 and 0.65 g of the 2% aqueous solution of sodium hypophosphite were used. The neutralization degree of the monomer in this reaction mixture was 90 mole percent. The monomer concentration was 40% by mass. The V-50 addition amount was 0.03 g per mole of the monomer. The sodium hypophosphite addition amount was 0.01 g per mole of the monomer. This reaction mixture was subjected to polymerization in the same manner as in Example 32 to give a polymer (22) comprising a partially neutralized polyacrylic acid. The weight average inertial radius and insoluble matter content of polymer (22) were determined in the same manner as in Example 32. The results are shown in Table 6.

COMPARATIVE EXAMPLE 13

A reaction mixture was prepared in the same manner as in Example 32 except that the use of the 2% aqueous solution of sodium hypophosphite was omitted and 7.96 g of deionized water was used.

The neutralization degree of the monomer in this reaction mixture was 25 mole percent. The monomer concentration was 80% by mass. The V-50 addition amount was 0.03 g per mole of the monomer. The sodium hypophosphite addition amount was 0 g per mole of the monomer. This reaction mixture was subjected to. polymerization in the same manner as in Example 32 to give a comparative polymer (4) comprising a partially neutralized polyacrylic acid. The weight average inertial radius and insoluble matter content of comparative polymer (4) were determined in the same manner as in Example 32. The results are shown in Table 6.

COMPARATIVE EXAMPLE 14

A 2-liter four-necked flask equipped with a nitrogen gas inlet tube, a stirrer and so forth was charged with 222.9 parts of acrylic acid and 3.32 parts of deionized water, and 64.5 parts of a 48% aqueous solution of sodium hydroxide was added with cooling. Therefore, the neutralization degree of the monomer was 25 mole percent. Then, while stirring the aqueous solution in the flask, nitrogen gas was bubbled into the solution for 30 minutes to remove the dissolved oxygen.

Thereafter, 4.64 parts of a 2% aqueous solution of 2,2'-azobis(2-amidinopropane)dihydrochloride as a thermal polymerization initiator, and 4.64 parts of a 2% aqueous solution of sodium hypophosphite monohydrate were added to the above aqueous solution. Therefore, the used amount of 2,2'-azobis(2-amidinopropane)dihydrochloride was 0.03 g, and the used amount of sodium hypophosphite monohydrate was 0.03 g, per mole of the monomer. The monomer component concentration in the reaction mixture was 80%.

The same procedure was carried out using the same polymerization vessel as in Comparative Example 2, whereby partially neutralized polyacrylic acid was obtained in a gel-like form. This gel-like partially neutralized polyacrylic acid was treated in the same manner as in Example 32 to give a comparative polymer (5). The weight average inertial radius and insoluble matter content of the comparative polymer (5) were determined in the same manner as in Example 32. The results are shown in Table 6.

COMPARATIVE EXAMPLE 15

A reaction mixture was prepared in the same manner as in Example 32 except that 97.5 g of acrylic acid in lieu of acrylic acid in Example 32, 172.27 g of deionized water, 28.2 g of the 48% aqueous solution of sodium hydroxide, 2.03 g of the 2% aqueous solution of V-50, and 0 g of the 2% aqueous solution of sodium hypophosphite were used. This reaction mixture has a monomer neutralization degree of 25 mole percent. The monomer concentration was 35% by mass. The addition amount of V-50 was 0.03 g per mole of the monomer. The addition amount of sodium hypophosphite was 0 g per mole of the monomer. This reaction mixture was subjected to polymerization in the same manner as in Example 32 to give a gel-like polymer. An attempt was made to cut the gel-like polymer with scissors but the gel stuck to the scissors, making it difficult to cut the same.

Therefore, it can be judged that the water-soluble polymer obtained under the conditions of Comparative Example 15 had a smaller weight average inertial radius as compared with the water-soluble polymers produced under the conditions of Examples 32 to 42 described above and that it was poor in handling property because of the high possibility of sticking to the inside wall of the polymerization vessel or polymerization apparatus, the stirring device of the polymerization apparatus or the belt part of the belt polymerization apparatus, or the thermoplastic film used in the belt polymerization apparatus, or the disintegrator equipped where necessary.

Said gel was treated in the same manner as in Example 32 to give a comparative polymer (6). The weight average inertial radius and insoluble matter content of the comparative polymer (6) were determined in the same manner as in Example 32. The results are shown in Table 6. The residual monomer content of the comparative polymer (6) was determined in the same manner as in Example 1 and found to be 2.8 mole percent.

The water-soluble polymer produced under the conditions of this Comparative Example 15 was also found to have a higher residual monomer content as compared with the water-soluble polymers produced under the conditions of the Examples described above. Further, the weight average inertial radius of said water-soluble polymer was smaller than the values disclosed in Examples 32 to 42. Thus, the water-soluble polymer produced in Comparative Example 15 could be judged to be poor in flocculating and thickening effects as compared with the water-soluble polymers disclosed in the Examples.

TABLE 6

| | Monomer composition (mole ratio) | Monomer concentration (% by mass) | Neutralized group content (mole %) | Photo-polymerization initiator (g/mol) | Chain transfer agent (g/mol) | Photoirradiation intensity at time of initiation of polymerization (W/m$^2$) | Weight average inertial radius (nm) | Insoluble matter (% by mass) |
|---|---|---|---|---|---|---|---|---|
| Examples | | | | | | | | |
| 32 | AA | 80 | 25 | V-50, 0.03 | 0.03 | 3 | 231 | 2.6 |
| 33 | AA | 80 | 20 | V-50, 0.03 | 0.03 | 3 | 245 | 2.8 |
| 34 | AA | 50 | 80 | V-50, 0.03 | 0.03 | 3 | 183 | 3.9 |
| 35 | AA | 80 | 25 | DC, 0.03 | 0.03 | 3 | 222 | 3.2 |
| 36 | AA/AMPS = 50/50 | 60 | 25 | V-50, 0.03 | 0.03 | 3 | 245 | 2.3 |
| 37 | AA/HAPS = 97/3 | 80 | 25 | V-50, 0.03 | 0.03 | 3 | 243 | 2.4 |
| 38 | AA/MAA = 80/20 | 80 | 25 | V-50, 0.03 | 0.03 | 3 | 232 | 3.3 |
| 39 | AA | 80 | 25 | V-50, 0.03 | 0.03 | 7 | 214 | 3.8 |
| 40 | AA | 40 | 40 | V-50, 0.03 | 0.03 | 3 | 162 | 4.7 |
| 41 | AA | 90 | 20 | V-50, 0.03 | 0.03 | 3 | 165 | 4.5 |
| 42 | AA | 40 | 90 | V-50, 0.03 | 0.01 | 3 | 177 | 4.3 |
| Compar. Ex. | | | | | | | | |
| 13 | AA | 80 | 25 | V-50, 0.03 | 0 | 3 | 145 | 8.9 |
| 14 | AA | 80 | 25 | V-50, 0.03 | 0.03 | (Thermal polymerization) | 133 | 16.8 |
| 15 | AA | 35 | 25 | V-50, 0.03 | 0 | 3 | 128 | 5.8 |

The same symbols as used in Table 1 are used in Table 6.

From Table 6, it can be seen that, in Examples 33 and 34, the increase in monomer concentration from 50% to 80% resulted in an increase in weight average inertial radius from 183 to 245, in spite of the difference in a content of slightly neutralized group and in spite of the low insoluble matter contents, that the increase in monomer concentration from 40% to 80% resulted in an increase in weight average inertial radius from 162 to 214 in Examples 40 and 39 in spite of the difference in a content of slightly neutralized group and of the low insoluble matter content, and that the water-soluble polymers obtained by the photopolymerization method according to the invention and having a neutralized group content of 20 to 80 mole percent acquired an increased weight inertial square radius and improved physical properties as the monomer concentration in photopolymerization increased. It can be seen that when polymers having a large weight inertial square radius were produced by the conventional methods, the polymers obtained showed a tendency toward increases also in insoluble matter content but that, in the modes of practice of the production method of the invention, the insoluble matter amounted to not more than 5% and the polymers obtained had very good physical properties. Further, in Comparative Example 15, no chain transfer agent was used and the monomer concentration was as low as 35%, so that the weight inertial square radius of the water-soluble polymer obtained was only about 128; the water-soluble polymer obtained had no good physical properties.

From these results, it is evident that the use of a chain transfer agent and an increased monomer concentration at the time of photopolymerization, which are employed in the photopolymerization according to the present invention, make it possible to obtain water-soluble polymers having good physical properties.

EXAMPLE 43

A cataplasm base was prepared according to the formulation shown in the following Table 7.

TABLE 7

| Name of ingredient | % by mass |
|---|---|
| Polymer (12) obtained in Example 32 | 5 |
| Glycerol | 20 |
| Kaolin | 10 |
| Gelatin | 5 |
| Polyoxyethylene (20) sorbitan monooleate (product of Wako Pure Chemical) | 2 |
| Aluminum chloride | 1 |
| Methyl salicylate | 0.5 |
| 1-Mentol | 0.5 |
| Camphor | 0.5 |
| Peppermint oil | 0.5 |
| Water | 55 |
| Total | 100 |

The adhesiveness and shape retentivity (restorability) were evaluated in the same manner as in Example 10. The results are shown in Table 8.

EXAMPLES 44 TO 51

A cataplasm base was prepared in the same manner as in Example 43 except that each of polymers (13) to (20) prepared in Examples 33 to 40, respectively, was used in lieu of the polymer (12) used in Example 43, and evaluated for the adhesiveness and shape retentivity. The results are shown in Table 8.

COMPARATIVE EXAMPLE 16, 17 AND 19

A cataplasm base was prepared in the same manner as in Example 43 except that a comparative polymer (4), a comparative polymer (5) or a comparative polymer (6) prepared in Comparative Example 13, Comparative Example 14 or Comparative Example 15, respectively, was used in lieu of the polymer (12) used in Example 43, and evaluated for the adhesiveness and shape retentivity. The results are shown in Table 8.

COMPARATIVE EXAMPLE 18

A cataplasm base was prepared and the adhesiveness and shape retentivity were evaluated in the same manner as in Example 43 except that a mixture composed of 75 parts of sodium polyacrylate with a weight average molecular weight of 3,000,000 and 25 parts of polyacrylic acid with a weight average molecular weight of 50,000 was used in lieu of the polymer (12) used in Example 43. The results are shown in Table 8.

The sodium polyacrylate having a weight average molecular weight of 3,000,000 used in Comparative Example 18 had an insoluble matter content of 1.2%, and the polyacrylic acid having a weight average molecular weight of 50,000 used in Comparative Example 18 had an insoluble matter content of 0%.

TABLE 8

| | Polymer used | Adhesiveness | Shape retentivity |
|---|---|---|---|
| Example 43 | Polymer (12) obtained in Example 32 | 5 | 4 |
| Example 44 | Polymer (13) obtained in Example 33 | 4 | 5 |
| Example 45 | Polymer (14) obtained in Example 34 | 3 | 3 |
| Example 46 | Polymer (15) obtained in Example 35 | 4 | 4 |
| Example 47 | Polymer (16) obtained in Example 36 | 5 | 4 |
| Example 48 | Polymer (17) obtained in Example 37 | 5 | 5 |
| Example 49 | Polymer (18) obtained in Example 38 | 5 | 5 |
| Example 50 | Polymer (19) obtained in Example 39 | 4 | 4 |
| Example 51 | Polymer (20) obtained in Example 40 | 3 | 3 |
| Compar. Ex. 16 | Comparative polymer (4) obtained in Compar. Ex. 11 | 2 | 1 |
| Compar. Ex. 17 | Comparative polymer (5) obtained in Compar. Ex. 12 | 2 | 2 |
| Compar. Ex. 18 | Combined use of sodium polyacrylate with Mw3000000 and polyacrylic acid with Mw50000 | 3 | 2 |
| Compar. Ex. 19 | Comparative polymer (6) obtained in Compar. Ex. 13 | 2 | 2 |

In Table 8, the criteria for adhesiveness evaluation and for shape retentivity evaluation were the same as in Table 4.

EXAMPLES 52 TO 60

The evaluation was carried out in the same manner as in Example 21 except that the polymers (12) to (20) obtained in Examples 32 to 40 were used in lieu of the polymer (1) used in Example 21. The results are shown in Table 9.

COMPARATIVE EXAMPLES 20, 21 AND 22

The evaluation was carried out in the same manner as in Example 21 except that the comparative polymer (4), comparative polymer (5) or comparative polymer (6) obtained in Comparative Example 13, Comparative Example 14 or Comparative Example 15 was used in lieu of the polymer (1) used in Example 21. The results are shown in Table 9.

TABLE 9

| | Polymer used | Average grain diameter (mm) |
|---|---|---|
| Example 52 | Polymer (12) obtained in Example 32 | 4 |
| Example 53 | Polymer (13) obtained in Example 33 | 3 |
| Example 54 | Polymer (14) obtained in Example 34 | 5 |
| Example 55 | Polymer (15) obtained in Example 35 | 4 |
| Example 56 | Polymer (16) obtained in Example 36 | 2 |
| Example 57 | Polymer (17) obtained in Example 37 | 2 |
| Example 58 | Polymer (18) obtained in Example 38 | 6 |
| Example 59 | Polymer (19) obtained in Example 39 | 9 |
| Example 60 | Polymer (20) obtained in Example 40 | 12 |
| Compar. Ex. 20 | Comparative polymer (4) obtained in Compar. Ex. 11 | 23 |
| Compar. Ex. 21 | Comparative polymer (5) obtained in Compar. Ex. 12 | 26 |
| Compar. Ex. 22 | Comparative polymer (6) obtained in Compar. Ex. 13 | 22 |

EXAMPLE 61

A reaction mixture was prepared in the same manner as in Example 1. This reaction mixture contained acrylic acid and sodium acrylate as monomers, and the proportion of the salt form monomer (sodium acrylate) in the whole monomer, namely neutralization degree, was 10 mole percent. The monomer (acrylic acid plus sodium acrylate) concentration in the reaction mixture was 70% by mass. The addition amount of V-50 was 0.01 g per mole the monomer, and the addition amount of sodium hypophosphite was 0.02 g per mole of the monomer.

The same polymerization vessel as used in Example 1 was used. Cold water at 10° C. was introduced into the lower part 11 of such polymerization vessel through the socket 12 and discharged through the socket 13 while the lower part 11 of the polymerization vessel was covered with Saran Wrap and the space into which the reaction mixture was to be introduced was purged with nitrogen. Then, the reaction mixture was introduced into the polymerization vessel and irradiated with near-ultraviolet rays within the wavelength range of 300 to 450 nm at an intensity of 30 W/m$^2$ for 30 seconds using a black light mercury lamp (product of Toshiba, model H400BL-L). Immediately after the start of irradiation, the polymerization started. Then, a light-shielding plate quite nontransparent to light was inserted just below the mercury lamp, whereby the reaction mixture was inhibited from being irradiated with light. This irradiation-free period was maintained for 30 seconds. This procedure was repeated 8 times and, thereafter, the light-shielding plate was completely removed and was maintained for 7 minutes. Then, the temperature of the cold water being introduced through the socket 12 was raised to 80° C. and that temperature was maintained for 5 minutes to thereby drive the polymerization to completion. During the process, the polymerization proceeded very smoothly, without any anomalous reaction, such as bumping. A gel-like polymer was thus obtained.

The residual monomer content, relative to the starting monomers used, in the gel-like polymer was determined by the same method as used in Example 1 and was found to be 0.8 mole percent. The gel-like polymer was then cut to pieces by means of scissors, dried under reduced pressure at 80° C., ground in a desk grinder, and classified so as to pass a 40-mesh sieve, whereby a polymer (23) comprising partially neutralized salt of polyacrylic acid was obtained. This polymer (23) was dissolved in deionized water to give a concentration of 0.2% by stirring at 100 rpm for 30 minutes using a jar tester. The type B viscosity of this aqueous solution at 30° C. was 190 mPa·s and there was almost no insoluble matter observed.

EXAMPLE 62

A reaction mixture was prepared in the same manner as in Example 61 except that 157.1 g of acrylic acid and 46.96 g of methacrylic acid were used in lieu of 203.8 g of acrylic acid used in Example 61, 69.15 g of deionized water was used in lieu of 68.35 g thereof, 22.7 g of the 48% aqueous solution of sodium hydroxide in lieu of 23.6 g thereof, 1.36 g of the 2% aqueous solution of V-50 in lieu of 1.42 g thereof and 2.73 g of the 2% aqueous solution of sodium hypophosphite in lieu of 2.83 g thereof.

The neutralization degree of the monomer in this reaction mixture was 10 mole percent. The monomer concentration was 70% by mass. The addition amount of V-50 was 0.01 g per mole of the monomer. The addition amount of sodium hypophosphite was 0.02 g per mole of the monomer. A gel-like polymer was obtained in the same manner as in Example 61.

The residual monomer content of the gel-like polymer was determined by the same method as used in Example 1 and found to be 1.1 mole percent. This gel-like polymer was treated in the same manner as in Example 1 to give a polymer (24) comprising partially neutralized acrylic acid/methacrylic acid (mole ratio: 80/20). A 0.2% aqueous solution of the polymer (24) had a viscosity of 143 mPa·s and a very small amount of an insoluble matter was observed.

EXAMPLE 63

While feeding nitrogen gas continuously into the hood of a belt polymerizer having a 15-cm-wide, 150-cm-long belt made of stainless steel SUS 304, near-ultraviolet rays were irradiated at an irradiation intensity of 30 W/m$^2$ at the belt upper surface.

The above belt polymerizer had 1.5-cm-high weirs for retaining the reaction mixture on the belt upper surface, and a hood allowing nitrogen gas to pass therethrough and having a structure hanging over the upper surface of the belt. This hood had three near-ultraviolet lamps having a wavelength range of 300 to 450 nm disposed in the direction of the longer axis of the belt. Close to the top of the weirs, there were disposed twenty light shielding plates, 2.5 cm in width and 15 cm in length, at regular intervals of 2.5 cm from the reaction mixture feeding site and thereon. Furthermore, the polymerizer had a structure such that the reaction mixture could be cooled or heated from the under surface of the belt by means of cool water or warm water.

The same reaction mixture as used in Example 1, deprived of the dissolved oxygen in advance, was fed onto the upper surface of the belt. Simultaneously with the start of feeding, the belt was moved continuously at a rate of 5 cm/min. By this, the reaction mixture was irradiated with near-ultraviolet rays at 30 W/m$^2$ at 30-second intervals for 20 minutes. During this operation, the reaction mixture was cooled by spraying cold water at 5° C. in a shower-like manner from below the belt. In the next step heating zone, near-ultraviolet rays at 30 W/m$^2$ were irradiated continuously for 10 minutes. During this period, the reaction product (gel) was heated by spraying warm water at a temperature of 80° C. in a shower-like manner from below the belt. The reaction product (gel) was collected from the belt outlet by means of a scraper, whereby a gel-like polymer was obtained.

The residual monomer content in the gel-like polymer was determined by the same method as used in Example 1 and was found to be 1.4 mole percent. This gel-like polymer was treated in the same manner as in Example 61 to give a polymer (25) comprising partially neutralized polyacrylic acid. A 0.2% aqueous solution of the polymer (25) had a viscosity of 188 mPa·s, and a very small amount of an insoluble matter was observed.

EXAMPLE 64

The same polymerization as in Example 61 was performed except that the irradiation method of the near-ultraviolet ray was such that the light at an intensity of 30 W/m$^2$ was irradiated continuously from the beginning for 15 minutes, without using any light shielding plate. After 45 seconds from the start of irradiation, the reaction mixture bumped and a small amount of a gel-like matter adhered to Saran Wrap. After completion of the polymerization, the residual monomer content in the gel was determined by the same method as used in Example 1 and was found to be 4.6%. This gel after completion of the polymerization was treated in the same manner as in Example 61 to give a polymer (26) comprising a partially neutralized salt of polyacrylic acid. A 0.2% aqueous solution of the polymer (26) had a viscosity of 33 mPa·s, and a large amount of an insoluble matter was observed.

EXAMPLE 65

The same polymerization as in Example 61 was performed except that the irradiation method of the near-ultraviolet ray was such that the light at an intensity of 12 W/m$^2$ was irradiated continuously from the beginning for 15 minutes, without using any light-shielding plate. The polymerization proceeded smoothly and neither bumping nor other anomalous reactions occurred. The residual monomer content in the gel after completion of the polymerization was determined by the same method as used in Example 1 and was found to be 2.7 mole percent. This gel after completion of the polymerization was treated in the same manner as in Example 61 to give a polymer (27) comprising a partially neutralized salt of polyacrylic acid. A 0.2% aqueous solution of the polymer (27) had a viscosity of 83 mPa·s, and a small amount of an insoluble matter was observed.

EXAMPLE 66

A belt polymerizer (ST-boat type belt conveyer, product of Toyo Kogyo, conveyer length 8,800 mm, belt width 1,000 mm, belt material: fiber-reinforced Teflon (registered trademark)) equipped with black light mercury lamps (products of Toshiba, model H400-BL-L) so as to give an irradiation intensity of 22 W/m$^2$ on the reaction mixture (polymerizate) upper surface was passed through with nitrogen gas to obtain the oxygen concentration in the space (space above the reaction mixture) of 0.5% by volume or below. At one end of the belt polymerizer, a reaction mixture adjusted to 10° C. in advance and composed of 83.9 parts of acrylic acid, 83.8 parts of deionized water, 1.18 parts of a 5% Darocure 1173 solution in acrylic acid, and 1.18 parts of a 3% aqueous solution of sodium hypophosphite was fed. The acrylic acid concentration in the reaction mixture was 50%. The addition amount of Darocure 1173 was 0.05 g per mole of acrylic acid. The addition amount of sodium hypophosphite was 0.03 g per mole of acrylic acid. The feed rate was adjusted so that the thickness of the reaction mixture in the deepest portion or zone might amount to 25 mm. The belt speed was adjusted so that the polymerization time might amount to 20 minutes. A gel-like polymer comprising polyacrylic acid was obtained from the other end of the belt polymerizer. The gel-like polymer was cut to pieces with scissors and then transferred to a small-sized chopper (product of Masuko Sangyo, model MKB #22, die diameter 4.8 mm ø) for coarse grinding. The coarsely ground matter was spread on a sheet of wire gauze to a layer height of 25 mm and dried in a hot air circulating drier controlled at a temperature of 140° C. for 60 minutes. The dried product was treated in the same manner as in Example 1 and the intrinsic viscosity and insoluble matter content were determined. The intrinsic viscosity was 107 ml/mmol, and the insoluble matter content was 0.7%.

INDUSTRIAL APPLICABILITY

The method of producing a (meth)acrylic acid based water-soluble polymer according to the invention, which has the above-mentioned constitution, makes it possible to reduce the polymerization time and lower the polymerization temperature to thereby reduce the risk of bumping of the polymerization reaction mixture, and it improves the productivity as well as allows the molecular weight to increase to a sufficiently high level and thus can produce (meth) acrylic acid based water-soluble polymers having good fundamental performance characteristics and having a low insoluble matter content.

The (meth)acrylic acid based water-soluble polymer of the invention, which has the constitution mentioned above, exhibits good flocculating or/and thickening effects and, therefore, can suitably be used in various fields of application. When used as dug soil treating agents, they are excellent in safety and can modify hydrous soils into high-strength soils at low addition levels. When used as cataplasm additives, they can provide high levels of adhesiveness and shape retentivity.

The invention claimed is:

1. A (meth) acrylic acid water-soluble polymer having a content of groups in neutralized state of not more than 10 mole percent, where the sum total of acid groups and groups in neutralized state contained in the (meth) acrylic acid water-soluble polymer is taken as 100 mole percent, wherein the (meth) acrylic acid water-soluble polymer is prepared from the monomer component containing not less than 50 mole percent of a (meth) acrylic acid monomer with the total monomer component subjected to polymerization being taken as 100 mole percent, and wherein an intrinsic viscosity of a neutralized product obtained by neutralization of all acid groups of the said polymer in a 2 N aqueous solution of sodium hydroxide at 30° C. is 60 to 120 ml/mmol, and wherein an insoluble matter content in deionized water is less than 5% by mass, said insoluble matter content being the value determined by adding 1.0 g of said (meth) acrylic acid water-soluble polymer to 500 g of deionized water, stirring the mixture at 25° C. for 2 hours, filtering the mixture through a 32-mesh filter, separating the insoluble matter in hydrous state and making a calculation according to the following formula:

Insoluble matter content (% by mass)=(mass (g) of insoluble matter/500 (g))×100.

2. The (meth) acrylic acid water-soluble polymer according to claim 1 which is produced by the method of producing a (meth) acrylic acid water-soluble polymer which comprises a photopolymerization step of polymerizing a monomer component, by irradiating near-ultraviolet rays to a reaction mixture, the said reaction mixture comprising the monomer component, a photopolymerization initiator, a chain transfer agent and a polymerization solvent, the said monomer component containing not less than 50 mole percent of a (meth) acrylic acid monomer, where the whole monomer component subjected to polymerization is taken as 100 mole percent, and a concentration of said monomer component in the reaction mixture at the time of polymerization being 40 to 97% by mass.

3. The (meth) acrylic acid water-soluble polymer according to claim 1, wherein said (meth) acrylic acid water-soluble polymer is produced by polymerizing a monomer component comprising 2-acrylamide-2-methylpropanesulfonic acid and/or a salt thereof and/or 3-allyloxy-2-hydroxypropanesulfonic acid and/or a salt thereof.

4. The (meth) acrylic acid water-soluble polymer according to claim 1, wherein the intrinsic viscosity of a neutralized product obtained by neutralization of all acid groups of the said polymer in a 2N aqueous solution of sodium hydroxide at 30° C. is 70 to 120 ml/mmol.

5. A dug soil treating agent which comprises the (meth) acrylic acid water-soluble polymer according to claim 1, as a main component.

6. A cataplasm additive which comprises the (meth) acrylic acid water-soluble polymer according to claim 1, as a main component.

* * * * *